(12) United States Patent
Sugamoto et al.

(10) Patent No.: US 11,124,228 B2
(45) Date of Patent: Sep. 21, 2021

(54) DRIVING ASSISTANCE APPARATUS

(71) Applicant: TOYOTA JIDOSHA KABUSHIKI KAISHA, Toyota (JP)

(72) Inventors: Shusaku Sugamoto, Toyota (JP); Terumasa Endo, Miyoshi (JP); Satoshi Inoue, Anjo (JP); Takeshi Hamaguchi, Seto (JP); Shuhei Manabe, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 16/396,869

(22) Filed: Apr. 29, 2019

(65) Prior Publication Data
US 2019/0367082 A1 Dec. 5, 2019

(30) Foreign Application Priority Data
Jun. 5, 2018 (JP) .............................. JP2018-107751

(51) Int. Cl.
*B62D 6/00* (2006.01)
*B62D 6/08* (2006.01)
*B62D 15/02* (2006.01)
*B60W 50/08* (2020.01)

(52) U.S. Cl.
CPC .......... *B62D 6/002* (2013.01); *B60W 50/087* (2013.01); *B62D 15/029* (2013.01); *B62D 6/08* (2013.01)

(58) Field of Classification Search
None
See application file for complete search history.

(56) References Cited

U.S. PATENT DOCUMENTS

| 8,996,251 | B2* | 3/2015 | Kataoka ................. B62D 6/008 |
| | | | 701/41 |
| 9,327,765 | B2* | 5/2016 | Takeda ................... B62D 6/003 |
| 10,289,113 | B2* | 5/2019 | Perkins .............. B60W 30/182 |
| 2003/0060936 | A1 | 3/2003 | Yamamura et al. |
| 2013/0179023 | A1 | 7/2013 | Schmidt |
| 2015/0336587 | A1* | 11/2015 | Inoue ................. B62D 15/0285 |
| | | | 701/41 |
| 2017/0088174 | A1* | 3/2017 | Inoue ................. B60T 8/17557 |

FOREIGN PATENT DOCUMENTS

| DE | 10 2004 012 144 A1 | 9/2005 |
| DE | 10 2011 121 948 A1 | 6/2013 |
| JP | 2003063430 A | 3/2003 |
| JP | 2015219830 A | 12/2015 |
| JP | 2017065323 A | 4/2017 |

* cited by examiner

*Primary Examiner* — Aniss Chad
*Assistant Examiner* — Mahmoud M Kazimi
(74) *Attorney, Agent, or Firm* — Sughrue Mion, PLLC

(57) ABSTRACT

A driving assistance apparatus predicts an appropriate operation amount which is an operation amount performed by a driver in correspondence with the external environment, and sets the appropriate operation amount range including the appropriate operation amount, an appropriate operation amount range including the appropriate operation amount, and changes the reaction force characteristics of the operation device when it is determined that the operation amount of the driver corresponding to the prediction time point of the appropriate operation amount is not included in the appropriate operation amount range.

4 Claims, 10 Drawing Sheets

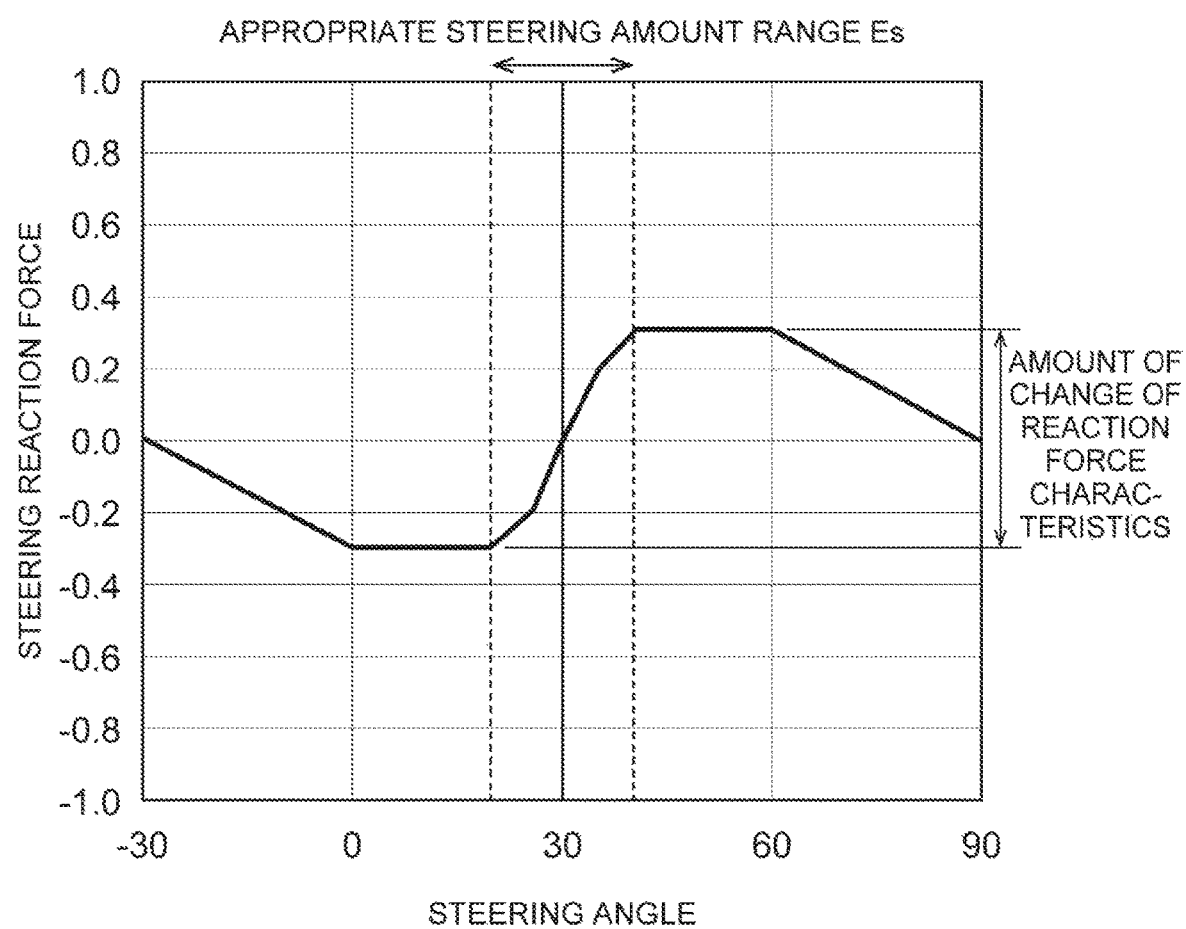

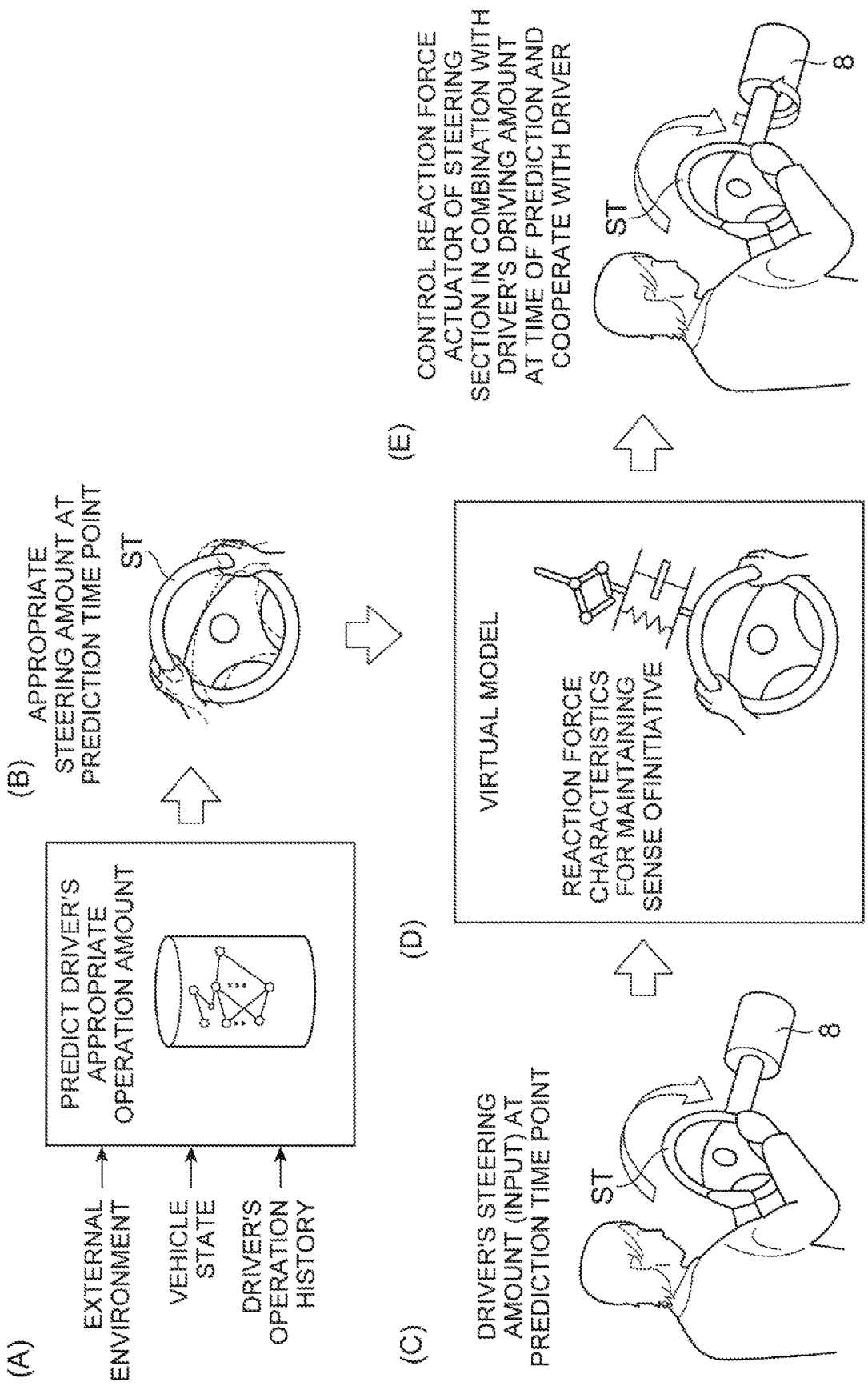

DRIVING ASSISTANCE APPARATUS

TECHNICAL FIELD

The present disclosure relates to a driving assistance apparatus.

CROSS-REFERENCE TO RELATED APPLICATION

This application claims the benefit of priority from Japanese Patent Application No. 2018-107751, filed Jun. 5, 2018, the entire contents of which are incorporated herein by reference.

BACKGROUND

In the related art, Japanese Unexamined Patent Publication No. 2003-063430 is known as a technical literature relating to a driving assistance apparatus. In this publication, there is described an apparatus that estimates a driving operation amount required for a driver in the future, and controls the operation of vehicle's equipment so as to prompt the necessary driving operation amount for the driver.

SUMMARY

However, when an operation interference is performed so as to prompt the necessary driving operation amount for the driver, this leads to a deterioration in the sense of initiative of the driver in the driving operation. For this reason, it is required to provide a driving assistance such that the operation amount of the driver becomes appropriate while maintaining the sense of initiative of the driver.

An aspect of the present disclosure provides a driving assistance apparatus that assists a driving operation of a vehicle by a driver, the apparatus includes: an operation amount recognition unit configured to recognize an operation amount of the driver for the operation device of the vehicle; an operation history storage unit configured to store an operation history which is a history of the operation amount of the driver; an external environment recognition unit configured to recognize an external environment of the vehicle; an appropriate operation amount prediction unit configured to predict an appropriate operation amount which is the operation amount performed by the driver in correspondence with the external environment, based on the operation history of the driver and the external environment; an appropriate operation amount range setting unit configured to set an appropriate operation amount range including the appropriate operation amount when the appropriate operation amount is predicted by the appropriate operation amount prediction unit; a determination unit configured to determine whether or not the operation amount of the driver corresponding to a prediction time point of the appropriate operation amount is included in the appropriate operation amount range; and a reaction force characteristics change unit configured to change reaction force characteristics of the operation device such that a reaction force increase amount with respect to the increase of the operation amount in the appropriate operation amount range is large compared to the reaction force increase amount with respect to the increase of the operation amount from the operation amount at the time of the determination to the appropriate operation amount range, or such that the reaction force decrease amount with respect to the decrease of the operation amount in the appropriate operation amount range is large compared to the reaction force decrease amount with respect to the decrease of the operation amount from the operation amount at the time of the determination to the appropriate operation amount range, when it is determined by the determination unit that the operation amount of the driver corresponding to the prediction time point of the appropriate operation amount is not included in the appropriate operation amount range.

In the driving assistance apparatus according to an aspect of the present discloser, when it is determined that the operation amount of the driver corresponding to the prediction time point for the appropriate operation amount is not included in the appropriate operation amount range, the reaction force characteristics of the operation device is changed such that the reaction force increase amount with respect to the increase of operation amount in the appropriate operation amount range is large compared to the reaction force increase amount with respect to the increase of the operation amount from the operation amount at the time of determination to the appropriate operation amount range. In this case, since the reaction force increase amount with respect to the increase of the operation amount becomes large when the operation amount of the driver enters the appropriate operation amount range, it is possible to prevent the driver from increasing the force required for further operation and causing the operation amount of the driver to exceed the appropriate operation amount range, and thus, it is possible to make the operation amount of the driver easy to stay in the appropriate operation amount range.

Alternatively, in the driving assistance apparatus, when it is determined that the operation amount of the driver corresponding to the prediction time point for the appropriate operation amount is not included in the appropriate operation amount range, the reaction force characteristics of the operation device is changed such that the reaction force decrease amount with respect to the decrease of operation amount in the appropriate operation amount is large compared to the reaction force decrease amount with respect to the decrease of the operation amount from the operation amount at the time of determination to the appropriate operation amount range. In this case, since the reaction force decrease amount with respect to the decrease of the operation amount becomes large when the operation amount of the driver enters the appropriate operation amount range, and the reaction force that boosts the operation amount of the driver decreases, it is possible to prevent the operation amount of the driver from exceeding the appropriate operation amount range, and thus, it is possible to make the operation amount of the driver easy to stay in the appropriate operation amount range. Furthermore, in the driving assistance apparatus, since it is easy for the operation amount of the driver to stay in the appropriate operation amount range by changing the reaction force characteristics of the operation device, it is possible to maintain the sense of initiative of the driver compared to the case where the operation amount of the driver is forcibly interfered so as to become the appropriate operation amount. Therefore, driving assistance apparatus, it is possible to perform the driving assistance such that the operation amount of the driver can be appropriate while maintaining the sense of initiative of the driver.

In the driving assistance apparatus according to an aspect of the present disclosure, the operation amount recognition unit may be configured to recognize a steering amount of the driver for a steering device of the vehicle as the operation amount of the driver for the operation device, the appropriate operation amount prediction unit may be configured to predict an appropriate steering amount as the appropriate operation amount, the appropriate operation amount range setting unit may be configured to set an appropriate steering amount range as the appropriate operation amount range, the determination unit may be configured to determine whether or not the steering amount of the driver corresponding to the prediction time point of the appropriate steering amount is included in the appropriate steering amount range, and the reaction force characteristics change unit is configured to change the reaction force characteristics of the steering device, such that the reaction force increase amount with respect to the increase of the steering amount in the appropriate operation amount range is large compared to the reaction force increase amount with respect to the increase of the steering amount from the steering amount at the time of the determination which is the steering amount at the time of determination to the appropriate operation amount range, or such that the reaction force decrease amount with respect to the decrease of the steering amount in the appropriate steering amount range is large compared to the reaction force decrease amount with respect to the decrease of the steering amount from the steering amount at the time of the determination to the appropriate steering amount range, when it is determined by the determination unit that the steering amount of the driver corresponding to the prediction time point of the appropriate steering amount is not included in the appropriate steering amount range.

Another aspect of the present disclosure provides a driving assistance apparatus that assists a driving operation of a vehicle by a driver, the apparatus includes: an operation amount recognition unit configured to recognize an operation amount of the driver for an operation device of the vehicle; an operation history storage unit configured to store an operation history which is a history of the operation amount of the driver; an external environment recognition unit configured to recognize an external environment of the vehicle; an appropriate operation amount prediction unit configured to predict an appropriate operation amount which is the operation amount performed by the driver in correspondence with the external environment, based on the operation history of the driver and the external environment; an appropriate operation amount range setting unit configured to set an appropriate operation amount range including the appropriate operation amount when the appropriate operation amount is predicted by the appropriate operation amount prediction unit; a determination unit configured to determine whether or not the operation amount of the driver corresponding to a prediction time point of the appropriate operation amount is included in the appropriate operation amount range; and a reaction force characteristics change unit configured to change reaction force characteristics of the operation device to reaction force characteristics for maintaining the sense of initiative with which the operation amount of the driver amount can easily remain in the appropriate operation amount range by performing a minute change on the reaction force characteristics of the operation device when it is determined by the determination unit that the operation amount is included in the appropriate operation amount range, when it is determined by the determination unit that the operation amount of the driver corresponding to the prediction time point of the appropriate operation amount is not included in the appropriate operation amount range.

According to the driving assistance apparatus, when it is determined that the operation amount of the driver amount corresponding to the prediction time point for the appropriate operation amount is not included in the appropriate operation amount range, it is possible to make the operation amount of the driver remain in the appropriate operation amount range by changing the reaction force characteristics to the reaction force characteristics for maintaining the sense of initiative in which the operation amount of the driver is likely to stay in the appropriate operation amount range by performing the minute change on the reaction force characteristics of the operation device. In addition, in the driving assistance apparatus, since it is easy for the operation amount of the driver to stay in the appropriate operation amount range by changing the reaction force characteristics of the operation device, it is possible to make the operation amount of the driver appropriate while maintaining the sense of initiative of the driver compared to the case where the operation amount of the driver is forcibly interfered so as to become the appropriate operation amount.

The driving assistance apparatus in another aspect of the present disclosure may further include a curve traveling recognition unit configured to determine whether or not the vehicle is traveling on a curve. The operation amount recognition unit may be configured to recognize a steering amount of the driver for the steering device of the vehicle as the operation amount of the driver for the operation device, the appropriate operation amount prediction unit may be configured to predict an appropriate steering amount as the appropriate operation amount, the appropriate operation amount range setting unit may be configured to set an appropriate steering amount range as the appropriate operation amount range, the determination unit may be configured to determine whether or not the steering amount of the driver corresponding to the prediction time point of the appropriate steering amount is included in the appropriate steering amount range, and when it is determined by the determination unit that the steering amount of the driver corresponding to the prediction time point of the appropriate steering amount is not included in the appropriate operation amount range and when it is determined by the curve traveling recognition unit that the vehicle is traveling on the curve, the reaction force characteristics change unit may be configured to change the reaction force characteristics of the steering device to the reaction force characteristics for maintaining the sense of initiative.

According to various aspects of the present disclosure, it is possible to perform the driving assistance such that the operation amount of the driver amount becomes appropriate while maintaining the sense of initiative of the driver.

BRIEF DESCRIPTION OF THE DRAWINGS

FIG. 5 is a graph for explaining the amount of change of reaction force characteristics from the reference reaction force characteristics to the reaction force characteristics for maintaining the sense of initiative.

FIG. 8 is diagrams for explaining a functional outline of the driving assistance apparatus.

DETAILED DESCRIPTION

Hereinafter, an embodiment of the present disclosure will be described with reference to the drawings.

Figure 1:
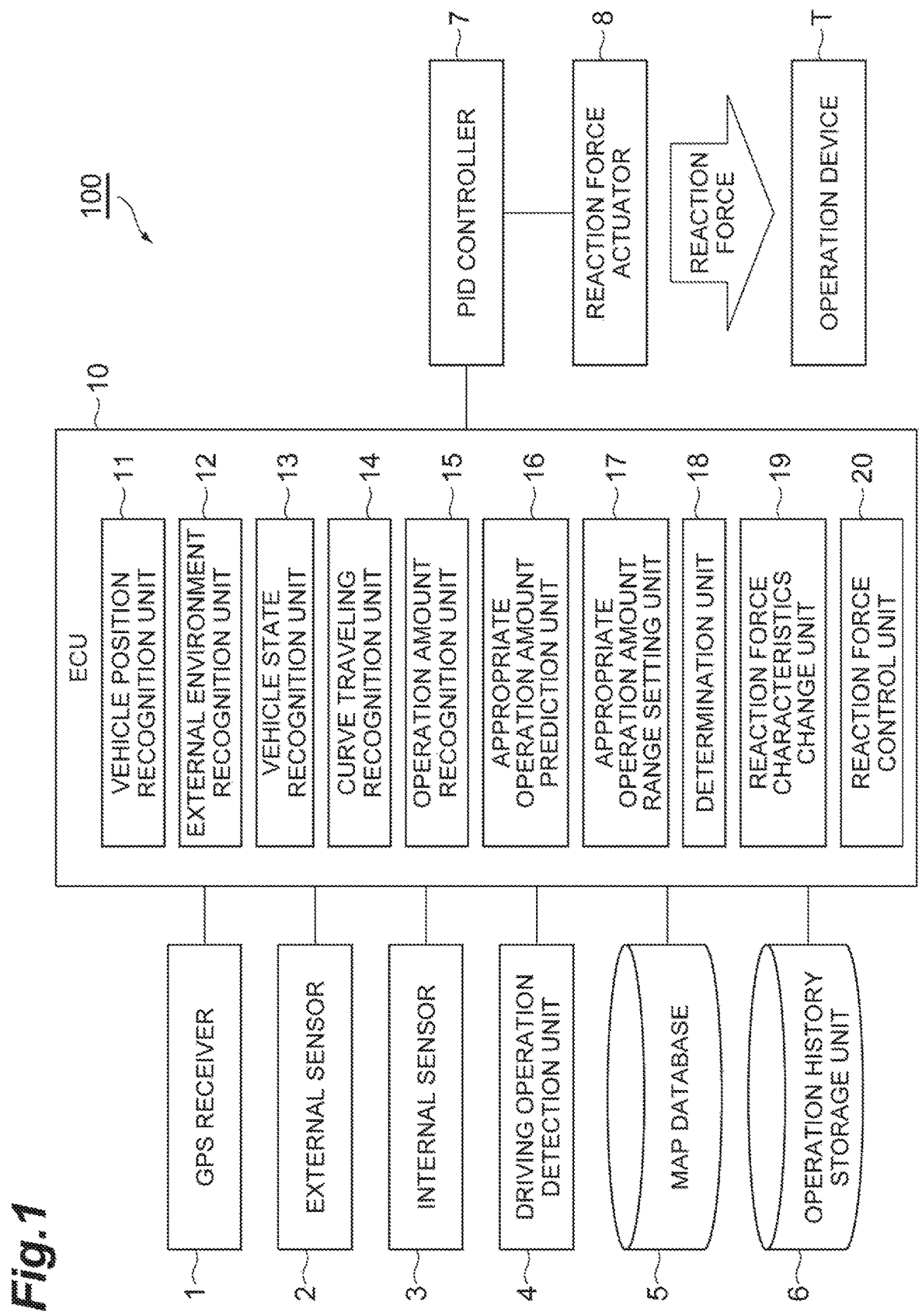
FIG. 1 is a block diagram illustrating a driving assistance apparatus according to an embodiment.

FIG. 1 is a block diagram illustrating a driving assistance apparatus according to an embodiment. A driving assistance apparatus 100 according to an embodiment illustrated in FIG. 1 performs driving assistance to change reaction force characteristics of an operation device T such that a operation amount of the driver to the operation device T of a vehicle becomes an appropriate operation amount. The driving assistance apparatus 100 performs the driving assistance while maintaining the sense of initiative of the driver by minor change of the reaction force characteristics.

Configuration of Driving Assistance Apparatus

As illustrated in FIG. 1, the driving assistance apparatus 100 includes an electronic control unit (ECU) 10 that performs an overall management of the apparatus. The ECU 10 is an electronic control unit including a central processing unit (CPU), read only memory (ROM), random access memory (RAM), a controller area network (CAN) communication circuit, and the like. In the ECU 10, for example, various functions are realized by loading a program stored in the ROM into the RAM and executing the program loaded in the RAM by the CPU. In the ECU 10, for example, various functions are realized by loading a program stored in the ROM into the RAM and executing the program loaded in the RAM by the CPU.

The ECU 10 is connected to a GPS receiver 1, an external sensor 2, an internal sensor 3, a driving operation detection unit 4, a map database 5, operation history storage unit 6, a proportional integral differential (PID) controller 7, and a reaction force actuator 8.

The GPS receiver 1 measures a position of the vehicle (for example, latitude and longitude of the vehicle) by receiving signals from equal to or more than three GPS satellites. The GPS receiver 1 transmits information on the measured position of the vehicle to the ECU 10.

The external sensor 2 is a detection device that detects a surrounding environment of the vehicle. The external sensor 2 includes at least one of a camera and a radar sensor.

The camera is an imaging device that images the external situation of the vehicle. The camera is provided on at the inside of a windshield of the vehicle. The camera transmits image information relating to surroundings of the vehicle to the ECU 10. The camera may be a monocular camera or may be a stereo camera.

The radar sensor is a detection device that detects obstacles around the vehicle using radio waves (for example, millimeter waves) or light. The radar sensor includes, for example, millimeter wave radar or a light detection and ranging (LIDAR). The radar sensor transmits the radio wave or light to the surroundings of the vehicle, and detects the obstacles by receiving radio waves or light reflected from obstacles. The radar sensor transmits the detected object information to the ECU 10.

The internal sensor 3 is a detection device that detects a travel state and a vehicle state of the vehicle. The internal sensor 3 includes a vehicle speed sensor, an accelerator sensor, and a yaw rate sensor. The vehicle speed sensor is a measurement device that measures a speed of the vehicle. As the vehicle speed sensor, for example, a vehicle wheel speed sensor is used, which is provided on vehicle wheels of the vehicle or on a drive shaft rotating integrally with vehicle wheels, and measures a rotational speed of the vehicle wheels. The vehicle speed sensor transmits the measured vehicle speed information (vehicle wheel speed information) to the ECU 10.

The accelerator sensor is a measurement device that measures an acceleration of the vehicle. The accelerator sensor includes, for example, a longitudinal accelerator sensor that measures acceleration in the longitudinal direction of the host vehicle V and a lateral accelerator sensor that measures a lateral acceleration of the host vehicle. The accelerator sensor transmits, for example, acceleration information of the vehicle to the ECU 10. The yaw rate sensor is a measurement device that measures a yaw rate (rotation angular velocity) around the vertical axis at the center of gravity of the vehicle. As the yaw rate sensor, for example, a Gyro sensor can be used. The yaw rate sensor transmits the measured yaw rate information of the vehicle to the ECU 10.

The driving operation detection unit 4 detects the operation amount of the driver of the operation device T of the vehicle. The operation device T of the vehicle is equipment to which the driver inputs the operation for driving the vehicle. The operation device T of the vehicle includes at least one of a steering device of the vehicle, an accelerator operation device of the vehicle, and a brake operation device of the vehicle.

The steering device is, for example, a steering wheel. The steering device is not limited to a case of wheel-shape, but may be any configuration as long as the section functions as a steering wheel. The accelerator operation device is, for example, an accelerator pedal. The brake operation device is, for example, a brake pedal. The accelerator operation device and the brake operation device do not necessarily need to be pedals, but may be any configurations as long as the driver can input the acceleration or the deceleration.

In addition, the operation device T of the vehicle has a reference position. The reference position is an initial state of the operation device T, and when the driver does not perform the operation, the operation device T is configured to return to the reference position. The operation device T is configured to generate reaction force according to an amount of change (an operation amount) when the reference position is changed by the driver's operation. When the driver operates the operation devices T so as to return to the reference position, the operation device T generates the reaction force (restoring force) so as to activate the driver's operation.

Figure 2A:
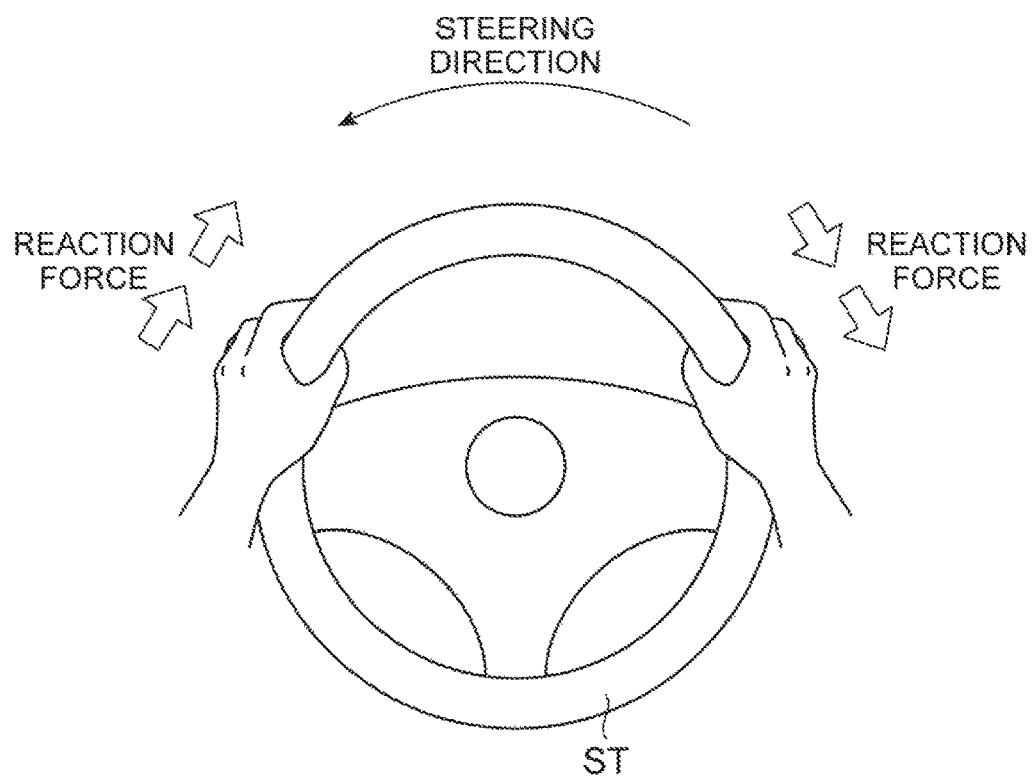
FIG. 2A is a diagram for explaining reaction force generated when a steering device is rotated from a reference position.
Figure 2B:
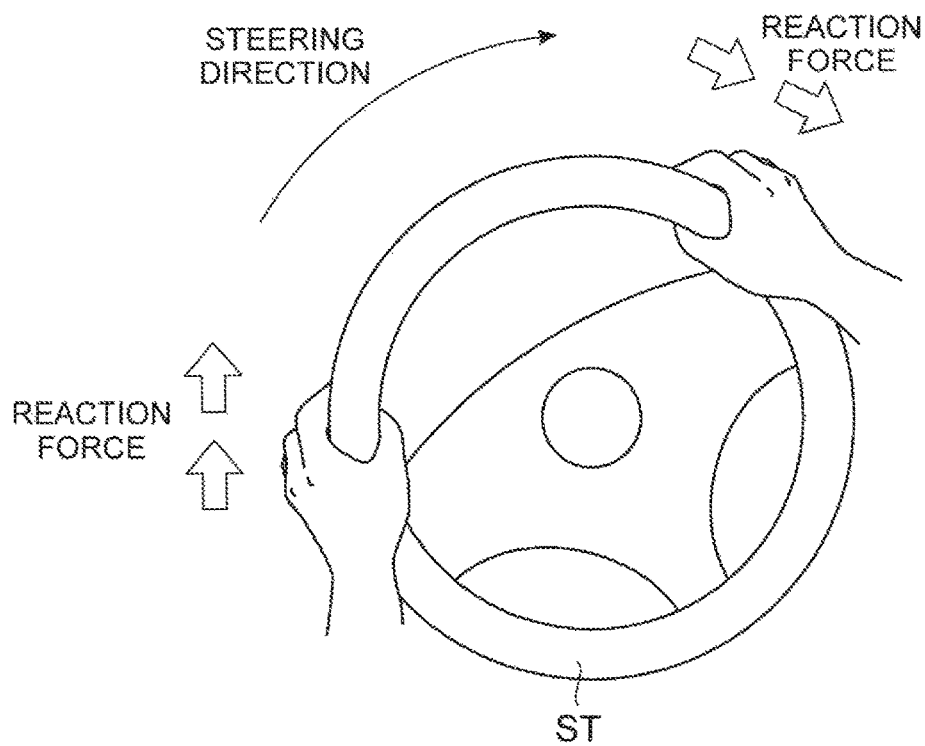
FIG. 2B is a diagram for explaining reaction force generated when the steering device is rotated so as to return to the reference position.

FIG. 2A is a diagram for explaining the reaction force generated when the steering device ST is rotated from a reference position. The steering device ST illustrated in FIG. 2A is in a state of reference position. As illustrated in FIG. 2A, when the driver rotates the steering device ST counterclockwise from the reference position, the reaction force is generated in the steering device ST so as to hinder the rotation by the driver. FIG. 2B is a diagram for explaining the reaction force generated when the steering device ST is rotated so as to return to the reference position. The steering device ST illustrated in FIG. 2B is rotated leftward from the reference position. In FIG. 2B, the driver rotates the steering device ST such that the steering device ST returns to the reference position. In this case, as illustrated in FIG. 2B, the reaction force is generated in steering device ST such that the rotation by driver is boosted (activated). The reaction force has been described with the steering device ST as an example, and also in the accelerator operation device and the brake operation device, the reaction force is generated such that each operation device returns to the reference position (for example, the initial position of the pedal).

The driving operation detection unit 4 includes at least one of a steering sensor, an accelerator sensor, and a brake sensor. The steering sensor measures the operation amount of the steering device by driver. The operation amount of the steering device includes a steering angle. The operation amount of the steering device may include a steering torque. The accelerator sensor measures the operation amount of the accelerator operation device by the driver. The operation amount of the accelerator operation device includes, for example, a pedal stroke (amount of pressing) of the accelerator pedal. The brake sensor measures the operation amount of the brake operation device by the driver. The operation amount of the brake operation device includes, for example, a pedal stroke (amount of pressing) of the brake pedal. The operation amount of the accelerator operation device and the brake operation device may include a pressing speed. The driving operation detection unit 4 transmits the operation amount information on the measured operation amount of the driver to the ECU 10.

The map database 5 is a database storing map information. The map database 5 is formed, for example, in a hard disk drive (HDD) mounted on the vehicle. The map information includes information on the position of the road, information on the shape of the road (for example, types of curves or straight roads, a curvature of the curve, or the like), information on the position of the intersection and the branch, and information on the position of a structure. The map information may also include traffic regulation information such as a speed limit associated with the position information. The map database 5 does not to be mounted on the vehicle, but may be stored in a server that can communicate with the vehicle.

The operation history storage unit 6 is a database that stores a operation history of the driver. The operation history storage unit 6 is configured in, for example, the HDD mounted on the vehicle. The operation history of the driver is a history of the operation amount of the driver.

The operation history storage unit 6 stores the operation amount of the driver history after the travel start of the vehicle. The operation history storage unit 6 may store the operation history of the driver separately for each trip of the vehicle. If a function of personal driver authentication is installed in the vehicle, the operation history storage unit 6 may store a past operation history for each individual personal authenticated driver. The operation history storage unit 6 may store all the operation history of the driver who drives the vehicle (operation history that does not distinguish the drivers from each individual), without performing the personal authentication. In addition, the operation history storage unit 6 may store the operation history of the driver in association with the external environment and the vehicle state of the vehicle at the time of operation. Details of the external environment and the vehicle state will be described later. The operation history storage unit 6 does not need to be mounted on the vehicle, but may be formed in a server that can communicate with the vehicle.

The PID controller 7 is a controller that performs PID control on the reaction force of the operation device T of the vehicle. The PID controller 7 calculates a command value from a control signal from the ECU 10 according to the operation amount of the driver and the result of control of the vehicle, and transmits the command value to the reaction force actuator 8. In this way, the PID controller 7 suppresses the influence of the disturbance such as the road surface condition to the operation device T.

The reaction force actuator 8 is an actuator that controls the reaction force of the operation device T of the vehicle. The reaction force actuator 8 is connected to the ECU 10 via the PID controller 7. The reaction force actuator 8 includes at least one of a steering reaction force actuator, an accelerator reaction force actuator, and a brake reaction force actuator.

The steering reaction force actuator controls the reaction force of the steering device of the vehicle. The steering reaction force actuator is an electric motor that is, for example, provided on a steering shaft and applies the reaction force (torque) to the steering device through the steering shaft. As the steering reaction force actuator, an electric power steering (EPS) motor may be used. As the steering reaction force actuator, an actuator in a steer-by-wire system in the steering device may be used. The steering reaction force actuator does not need to output all of the reaction force, but may adjust the reaction force felt by the driver by changing the output in combination with the reaction force mechanically transmitted from the tire. The steering reaction force actuator gives the reaction force to the steering device based on the command value transmitted from the PID controller 7.

The accelerator reaction force actuator controls the reaction force of the accelerator operation device of the vehicle. The accelerator reaction force actuator is an electric motor provided, for example, on the accelerator pedal, and gives the reaction force to the accelerator pedal. The accelerator reaction force actuator gives the reaction force to the accelerator pedal (accelerator operation device) based on the command value transmitted from PID controller 7. The brake reaction force actuator controls the reaction force of the brake operation device of the vehicle. The brake reaction force actuator is an electric motor provided on, for example, the brake pedal, and gives the reaction force to the brake pedal. The brake reaction force actuator gives the reaction force to the brake pedal (brake operation device) based on the command value transmitted from the PID controller 7.

Next, a functional configuration of the ECU 10 will be described. The ECU 10 includes a vehicle position recognition unit 11, an external environment recognition unit 12, a vehicle state recognition unit 13, a curve traveling recognition unit 14, an operation amount recognition unit 15, an appropriate operation amount prediction unit 16, an appropriate operation amount range setting unit 17, a determination unit 18, a reaction force characteristics change unit 19, and a reaction force control unit 20. A part of the functions of the ECU 10 described below may be performed in a server that can communicate with the vehicle.

The vehicle position recognition unit 11 recognizes a vehicle position on the map based on the position information from the GPS receiver 1 and the map information in the map database 5. In addition, the vehicle position recognition unit 11 may recognize the vehicle position on the map using the position information on fixed obstacles such as utility poles included in the map information in the map database 5 and the result of detection performed by the external sensor 2 using a simultaneous localization and mapping (SLAM) technology. The vehicle position recognition unit 11 may recognize the vehicle position on the map using a well-known method.

The external environment recognition unit 12 detects an external environment of the vehicle based on the result of detection performed by the external sensor 2 (image captured by the camera and/or object information by the radar sensor) and the vehicle position on the map and map information recognized by the vehicle position recognition unit 11. The external environment includes road situations around the vehicle and object situations around the vehicle.

The road situation includes the curvature of the traveling road on which the vehicle travels. The road situation may include slopes, lane widths, and the number of lanes. The external environment recognition unit 12 can recognize the road situation from the map information and/or from the result of detection performed by the external sensor 2. The object situation includes a position of the object with respect to the vehicle. The object situation may include a moving direction of the object with respect to the vehicle and a relative speed of the object with respect to the vehicle. The external environment recognition unit 12 can recognize the object situation from the result of detection performed by the external sensor 2.

The vehicle state recognition unit 13 recognizes the state of the traveling vehicle based on the result of measurement performed by the internal sensor 3. The vehicle state includes at least one of a vehicle speed of the vehicle, an acceleration of the vehicle, and a yaw rate of the vehicle. The vehicle state recognition unit 13 can recognize the vehicle speed of the vehicle based on the vehicle speed information from the vehicle speed sensor. The vehicle state recognition unit 13 can recognize the acceleration (a longitudinal acceleration and a lateral acceleration) of the vehicle based on the acceleration information from the accelerator sensor. The vehicle state recognition unit 13 can recognize the yaw rate of the vehicle based on the yaw rate information from the yaw rate sensor.

The curve traveling recognition unit 14 determines whether or not the vehicle is traveling on a curve. The curve traveling recognition unit 14 determines whether or not the vehicle is traveling on a curve based on the curvature of the traveling road recognized by external environment recognition unit 12.

The operation amount recognition unit 15 recognizes the operation amount of the driver on the operation device T of the vehicle based on the operation amount information from the driving operation detection unit 4. The operation amount recognition unit 15 recognizes at least one of the steering amount of the driver on the steering device of the vehicle, the driver's accelerator operation amount on the accelerator operation device of the vehicle, and the driver's brake operation amount on the brake operation device of the vehicle, as the operation amount of the driver. The operation amount recognition unit 15 may store the result of recognizing the operation amount of the driver in the operation history storage unit 6.

The appropriate operation amount prediction unit 16 predicts a appropriate operation amount of the driver based on the operation history of the driver stored in the operation history storage unit 6, the external environment recognized by the external environment recognition unit 12, and the vehicle state recognized by the vehicle state recognition unit 13. For example, at least the operation history from the current time point to a certain time before can be used as the operation history of the driver. A certain time is, for example, several seconds.

The appropriate operation amount is an operation amount that the driver normally tries to operate corresponding the external environment along the operation history of the driver. The appropriate operation amount is predicted as the operation amount when it is assumed that the driver grasps the external environment and the vehicle state based on the operation history of the driver, external environment, and the vehicle state, and performs the appropriate driving operation. As an example, the appropriate operation amount can be an operation amount in which the vehicle travels in the vicinity of the center of the driving lane and the distance between the vehicle and the surrounding object such as a preceding vehicle can be secured as equal to or longer than a certain distance. The appropriate operation amount includes at least one of an appropriate steering amount corresponding to the steering amount, an appropriate accelerator operation amount corresponding to the accelerator operation amount, and an appropriate brake operation amount corresponding to the brake operation amount.

The appropriate operation amount prediction unit 16 predicts the appropriate operation amount at a prediction time point set in advance. The prediction time point is a time point at which the appropriate operation amount is predicted. The prediction time point can be, for example, 0.5 seconds, 1 second, and 2 seconds after the current time point. The prediction time point may be a time point after a lapse of a time longer than a certain time considering the processing cycle of the vehicle such that the time point does not become a past time at the time of performing the control.

As an example, the appropriate operation amount prediction unit 16 predicts the appropriate operation amount using a driving behavior model optimized by machine learning. The driving behavior model is generated in such a manner that the appropriate operation amount is output at the prediction time point when the operation history of the driver, the external environment, and the vehicle state are input. The appropriate operation amount prediction unit 16 may predict the appropriate operation amount using a statistical model. From vast statistical data in which the operation history of the driver, the external environment, and the vehicle state, and the subsequent operation amount of the driver are associated with each other, the appropriate operation amount prediction unit 16 searches for a case having the similar operation history of the driver, the external environment, and the vehicle state, and then, the operation amount of the driver can be predicted using the appropriate operation amount in the similar case. The statistical data is stored in, for example, a server that can communicate with the vehicle. The method of predicting the appropriate operation amount by the appropriate operation amount prediction unit 16 is not particularly limited, and various methods can be adopted. The appropriate operation amount prediction unit 16 may predict the appropriate operation amount using a driving trend of a driver instead of the operation history of the driver. The driver's driving trend can be obtained from the operation history of the driver using a well known evaluation method.

When the appropriate operation amount is predicted by the appropriate operation amount prediction unit 16, the appropriate operation amount range setting unit 17 sets an appropriate operation amount range including the appropriate operation amount. The appropriate operation amount range is a range of the operation amount including the appropriate operation amount. The appropriate operation amount range may be set as a range with the appropriate operation amount as a median value. The appropriate operation amount range can be set as a certain range set in advance. The appropriate operation amount range does not necessarily need to be the median value of the appropriate operation amount, and the appropriate operation amount may be a value deviated from the median value.

The appropriate operation amount range includes at least one of an appropriate steering amount range corresponding to the appropriate steering amount, an appropriate accelerator operation amount range corresponding to the appropriate accelerator operation amount, and an appropriate brake operation amount range corresponding to the appropriate brake operation amount. As a specific example, the appropriate steering amount range can be a range of equal to or larger than −10 degrees and equal to or smaller than +10 degrees with a clockwise steering as a positive steering angle and with the appropriate steering amount as a median value. The appropriate steering amount range may be a range of equal to or larger than −5 degrees and equal to or smaller than +5 degrees with the appropriate steering amount as a median value. Regarding the appropriate accelerator operation amount range, a certain accelerator operation amount range with the appropriate accelerator operation amount as a median value can be the appropriate accelerator operation amount range. The same is true for the case of appropriate brake operation amount range.

The determination unit 18 determines whether or not the operation amount of the driver corresponding to the prediction time point for the appropriate operation amount is included in the appropriate operation amount range based on the operation amount of the driver recognized by the operation amount recognition unit 15 and the appropriate operation amount range set by the appropriate operation amount range setting unit 17.

The operation amount of the driver corresponding to the prediction time point for the appropriate operation amount is the operation amount of the driver recognized at the prediction time point, for example. As the operation amount of the driver amount corresponding to the prediction time point for the appropriate operation amount, the operation amount of the driver recognized immediately before the prediction time point (for example, the recognition timing of the previous operation amount) may be used. Hereinafter, the operation amount of the driver amount when the operation amount of the driver amount corresponding to the prediction time point for the appropriate operation amount is determined not to be included in the appropriate operation amount range is referred to as an operation amount at the time of determination. The operation amount at the time of determination includes at least one of a steering amount at the time of determination, an accelerator operation amount at the time of determination, and a brake operation amount at the time of determination.

When it is determined by the determination unit 18 that the operation amount of the driver amount corresponding to the prediction time point for the appropriate operation amount is not included in the appropriate operation amount range and when it is determined by the curve traveling recognition unit 14 that the vehicle is traveling on a curve, the reaction force characteristics change unit 19 changes the reaction force characteristics of the operation device T to the reaction force characteristics for maintaining the sense of initiative.

The reaction force characteristics change unit 19 can change the reaction force characteristics using, for example, a virtual model optimized by machine learning. When the types of operation device T (the types of the steering device, the accelerator operation device, and the brake operation device), the appropriate operation amount, the operation amount of the driver, and the current operation amount are input, the virtual model outputs the reaction force characteristics for maintaining the sense of initiative. At least one of the reference reaction force characteristics of the operation device T and the appropriate operation amount range may be included in the input to the virtual model. By selecting any one of the type of operation device T, the appropriate operation amount, and the appropriate operation amount range from the prepared reaction force characteristics for maintaining the sense of initiative patterns, the reaction force characteristics change unit 19 may change the reaction force characteristics to the reaction force characteristics for maintaining the sense of initiative. The reaction force characteristics change unit 19 may use a physical model, a mathematical model, or a statistical model. The method of changing the reaction force characteristics using the reaction force characteristics change unit 19 is not particularly limited, and various methods can be adopted.

The reaction force characteristics of the operation device T is the characteristics of the reaction force given to the operation device T according to the operation amount of the driver for the operation device T. The reaction force characteristics relates to the amount of change of the reaction force according to the change of the operation amount of the driver for the operation device T. The reaction force characteristics relates to force sensing characteristics felt by the driver from the operation device T.

Here, the reaction force characteristics of the operation device T when it is determined by the determination unit 18 that the operation amount of the driver amount corresponding to the prediction time point for the appropriate operation amount is included in the appropriate operation amount range is referred to as reference reaction force characteristics. The reaction force characteristics for maintaining the sense of initiative can be set by performing a minute change on the reference reaction force characteristics. The minute change means a change of such an extent that the sense of initiative of the driver can be maintained.

The reaction force characteristics for maintaining the sense of initiative means reaction force characteristics in which the operation amount of the driver is likely to stay in the appropriate operation amount range while maintaining the sense of initiative of the driver. The sense of initiative of the driver is the sense of initiative for the driver's driving operation of the vehicle. The sense of initiative of the driver relates to the driver's willingness to the driving operation. Excessive operation intervention on the driver's driving operation decreases the driver's willingness to the driving operation and impairs the sense of initiative.

The reaction force characteristics for maintaining the sense of initiative can be defined as the reaction force characteristics in which a reaction force increase amount with respect to the increase of the operation amount in the appropriate operation amount range is large compared to a reaction force increase amount with respect to the increase of the operation amount from the operation amount at the time of determination that the operation amount of the driver is not included in the appropriate operation amount range to the appropriate operation amount range. "When the reaction force increases with respect to the change in the operation amount" means a time when the operation device is operated to leave from the reference position. Specifically, a case where the driver rotates the steering device in one direction so as to leave from the reference position (reference angle)

is included. In addition, a case where the driver is pressing the accelerator pedal or the brake pedal from the reference position is included.

In this case, while changing the operation amount for the operation device T so as to approach the appropriate operation amount (for example, the operation amount according to the curvature of the curve on which the vehicle travels), the reaction force increase amount felt by the driver after the operation amount reaches the appropriate operation amount range is large compared to that before the operation amount reaches the appropriate operation amount range. Therefore, the driver can decrease the possibility of deviating beyond the appropriate operation amount range caused by further increase of the operation amount, and thus, it is possible to make the operation amount of the driver easy to stay in the appropriate operation amount range.

Figure 3:
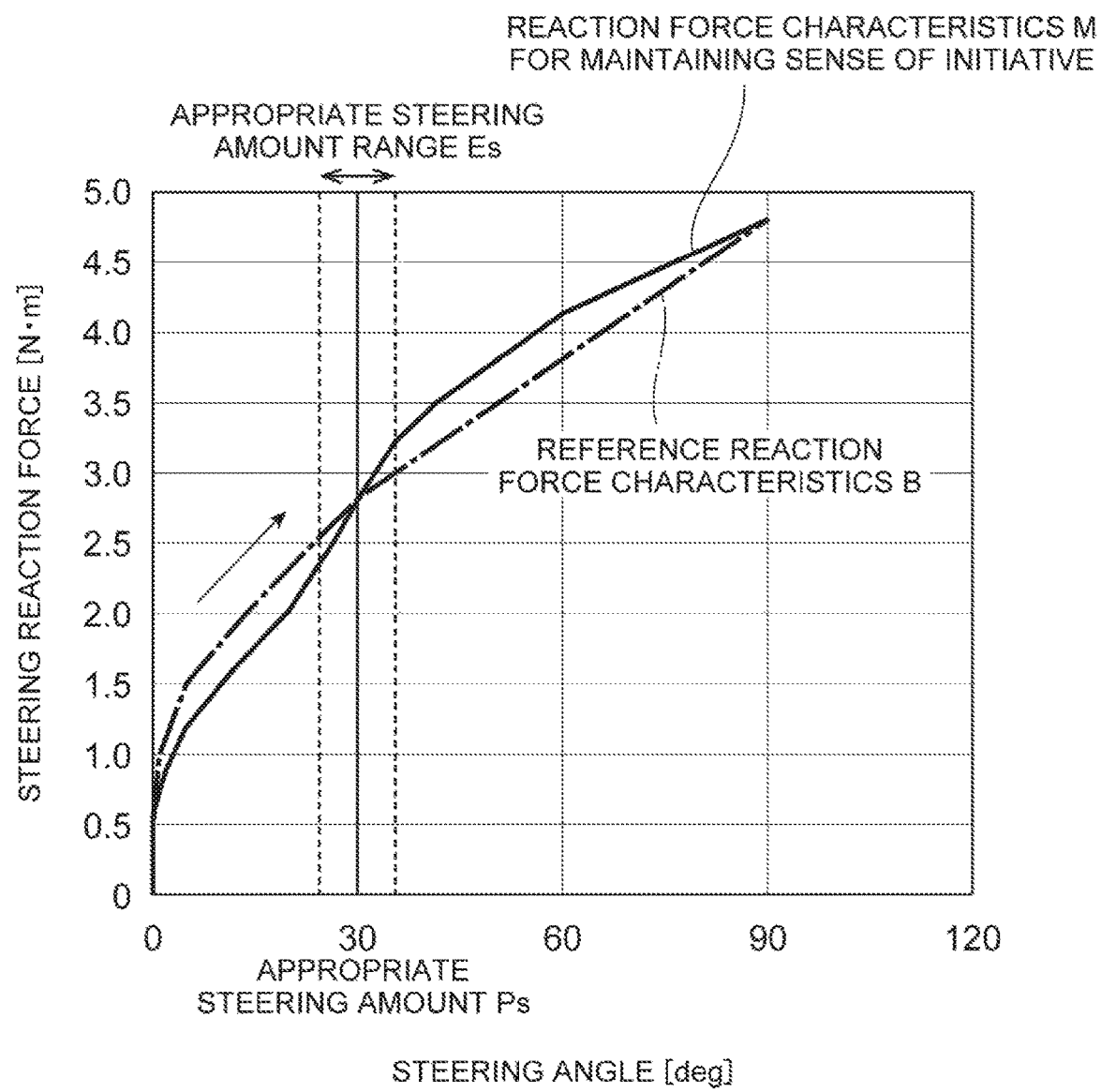
FIG. 3 is a graph illustrating reaction force characteristics when the steering device is rotated so as to leave from the reference position.

FIG. 3 is a graph illustrating the reaction force characteristics when the steering device ST is rotated so as to leave from the reference position. In FIG. 3, the vertical axis represents the steering reaction force and the horizontal axis represents the steering angle. The reference position is assumed to be 0 degree. FIG. 3 illustrates an example of the appropriate steering amount Ps, the appropriate steering amount range Es, the reference reaction force characteristics B, and the reaction force characteristics M for maintaining the sense of initiative. In FIG. 3, it is assumed that the appropriate steering amount Ps is set to 30 degrees, and the appropriate steering amount range Es is set to equal to or larger than 25 degrees and equal to or smaller than 35 degree. In addition, in FIG. 3, the vehicle is assumed to be traveling on a curve, and the current steering angle of the steering device ST is equal to or larger than 0 degrees and equal to or smaller than 25 degrees. That is, the current steering angle is not included in the appropriate steering amount range Es, and it is necessary to increase the steering angle so as to reach the appropriate steering amount Ps in order to leave from the reference position.

In the situation illustrated in FIG. 3, since it is determined by the determination unit 18 that the steering angle (steering amount) by the driver corresponding to the prediction time point of the appropriate steering amount is not included in the appropriate steering amount range Es, and it is determined by the curve traveling recognition unit 14 that the vehicle is running on the curve, the reaction force characteristics change unit 19 changes the reaction force characteristics of the steering device ST from the reference reaction force characteristics B to the reaction force characteristics M for maintaining the sense of initiative. The reaction force characteristics M for maintaining the sense of initiative is the reaction force (steering reaction force) same as the reference reaction force characteristics B in the appropriate steering amount Ps (30 degrees in this case). That is, the driver receives the reaction force same as the reference reaction force characteristics B when the operation amount reaches the appropriate steering amount Ps.

The reaction force characteristics change unit 19 changes the reaction force characteristics to the reaction force characteristics M for maintaining the sense of initiative by performing the minute change such that the reaction force increase amount with respect to the increase of steering angle in the appropriate steering amount range Es is large than that in the reference reaction force characteristics B. In the reaction force characteristics M for maintaining the sense of initiative, the reaction force increase amount with respect to the increase of the operation amount in the appropriate steering amount range Es is large compared to the reaction force increase amount (the reaction force increase amount along the reference reaction force characteristics B) with respect to the increase of the steering amount from the steering amount at the time of determination that the steering amount of the driver is not included in appropriate steering amount range Es to time of reaching the appropriate steering amount range Es.

The reaction force increase amount with respect to the increase of the steering angle corresponds to the slope of the reference reaction force characteristics B and the reaction force characteristics M for maintaining the sense of initiative in FIG. 3. The reaction force characteristics change unit 19 performs the minute change on the reaction force characteristics of the steering device ST to be the reaction force characteristics M for maintaining the sense of initiative in which the slope in the appropriate steering amount range Es becomes approximately three times or twice as large as the reference reaction force characteristics B. In the minute change, any magnification between 1.1 times to 5 times may be adopted.

As illustrated in FIG. 3, if the slope is approximately 3 times, the steering torque increase is approximately 12%. If the slope is approximately 2 times, the steering torque increase is approximately 7%. In the reaction force characteristics M for maintaining the sense of initiative, an upper limit of the increase in reaction force compared to the reference reaction force characteristics B may be 15%. In the appropriate steering amount range Es also, the reaction force characteristics is set in such a manner that the driver does not feel an excessive burden and can change the steering amount with the driver's intention.

Alternatively, the reaction force characteristics for maintaining the sense of initiative may be the reaction force characteristics in which a reaction force decrease amount with respect to the decrease of the operation amount in the appropriate operation amount range is large compared to the reaction force decrease amount with respect to the decrease of the operation amount from the operation amount at the time of determination to the appropriate operation amount range. "When the reaction force decreases with respect to the change in the operation amount" means a time when the operation device is operated to return to the reference position. Specifically, a case where the driver rotates the steering device to return to the reference position is included. In addition, a case where the driver weakens the pressing force on the accelerator pedal or the brake pedal so as to return pedals to the reference position is corresponding to the case described above. At this time, the reaction force felt by the driver is the reaction force that boosts the driver's operation (the reaction force which makes the operation device try to return to the reference position).

In this case, while changing the operation amount for the operation device T so as to approach the appropriate operation amount, the reaction force decrease amount felt by the driver after the operation amount reaches the appropriate operation amount range is large compared to that before the operation amount reaches the appropriate operation amount range (the reaction force boosting the driver's operation becomes easy to decrease). Therefore, the driver can decrease the possibility of deviating beyond the appropriate operation amount range caused by further increase of the operation amount, and thus, it is possible to make the operation amount of the driver easy to stay in the appropriate operation amount range.

Figure 4:
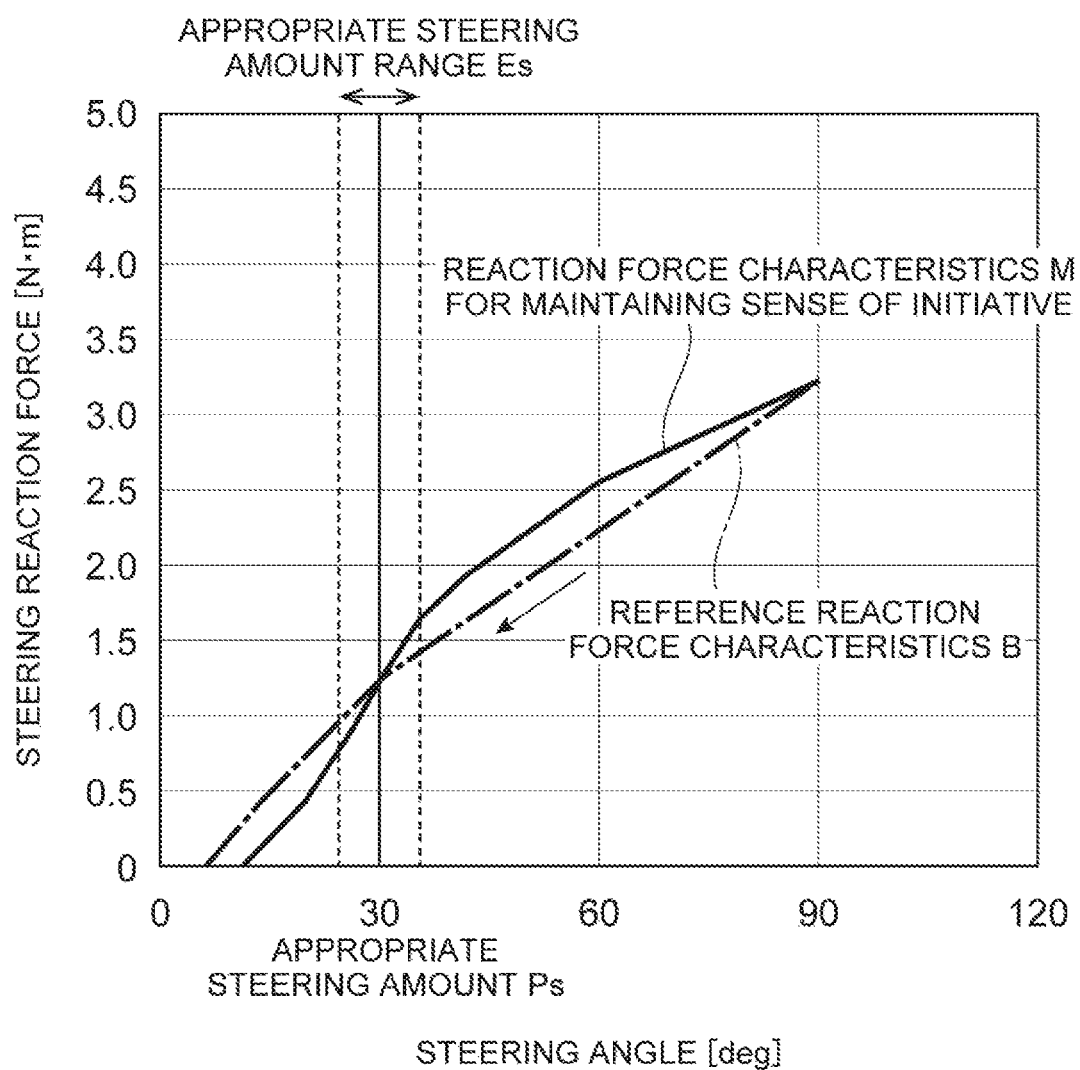
FIG. 4 is a graph illustrating reaction force characteristics when the steering device is rotated so as to return to the reference position.

Specifically, FIG. 4 is a graph illustrating the reaction force characteristics when the steering device ST is rotated so as to return to the reference position. The appropriate steering amount Ps and the appropriate steering amount range Es in FIG. 4 are the same as those in FIG. 3. In FIG. 4, the vehicle is assumed to be traveling on a curve, and the current steering angle of the steering device ST exceeds 35 degree. That is, the current steering angle is not included in the appropriate steering amount range Es, and it is necessary to decrease the steering angle so as to reach the appropriate steering amount Ps in order to reach the reference position.

In the situation illustrated in FIG. 4, since it is determined by the determination unit 18 that the steering angle (steering amount) by the driver corresponding to the prediction time point of the appropriate steering amount is not included in the appropriate steering amount range Es, and it is determined by the curve traveling recognition unit 14 that the vehicle is running on the curve, the reaction force characteristics change unit 19 changes the reaction force characteristics of the steering device ST from the reference reaction force characteristics B to the reaction force characteristics M for maintaining the sense of initiative.

The reaction force characteristics change unit 19 changes the reaction force characteristics to the reaction force characteristics M for maintaining the sense of initiative by performing the minute change such that the reaction force decrease amount with respect to the decrease of steering angle in the appropriate steering amount range Es is large than that in the reference reaction force characteristics B. In the reaction force characteristics M for maintaining the sense of initiative, the reaction force decrease amount with respect to the decrease of the operation amount in the appropriate steering amount range Es is large compared to the reaction force decrease amount (the reaction force decrease amount along the reference reaction force characteristics B) with respect to the decrease of the steering amount from the steering amount at the time of determination to time of reaching the appropriate steering amount range Es.

The reaction force decrease amount with respect to the decrease of the steering angle corresponds to the slope of the reference reaction force characteristics B and the reaction force characteristics M for maintaining the sense of initiative in FIG. 4. The reaction force characteristics change unit 19 performs the minute change on the reaction force characteristics of the steering device ST to be the reaction force characteristics M for maintaining the sense of initiative in which the slope in the appropriate steering amount range Es becomes approximately three times or twice as large as the reference reaction force characteristics B. In the minute change, any magnification between 1.1 times to 5 times may be adopted. The reaction force characteristics M for maintaining the sense of initiative is the reaction force same as the reference reaction force characteristics B in the appropriate steering amount Ps (30 degrees in this case).

FIG. 5 is a graph for explaining the amount of change of reaction force characteristics from the reference reaction force characteristics B to the reaction force characteristics M for maintaining the sense of initiative. In FIG. 5, the vertical axis represents the steering reaction force and the horizontal axis represents steering angle.

FIG. 5 illustrates the appropriate steering amount range Es and the amount of change of the reaction force characteristics.

The graph illustrated in in FIG. 5 corresponds to a force sensing interaction added to the reference reaction force characteristics B in order to perform the minute change on the reaction force characteristics M for maintaining the sense of initiative. The amount of change of the reaction force characteristics corresponds to the magnitude of the force sensing interaction. As illustrated in FIG. 5, the minute change is performed such that the slope of the appropriate steering amount range Es is large. For example, the minute change can be a change that is sufficiently small relative to basic reaction force characteristics (in comparing the maximum value, the change of equal to or smaller than $\frac{1}{5}$ or the like), or a change of such an extent that the operation device T does not significantly move due to the change. The reaction force characteristics change unit 19 changes the reaction force characteristics to the reaction force characteristics M for maintaining the sense of initiative by adding the minute change illustrated in in FIG. 5 to the reference reaction force characteristics B according to the predicted appropriate steering amount Ps and the set appropriate steering amount range Es. The reaction force characteristics change unit 19 does not necessarily need to prepare and use the amount of change illustrated in FIG. 5 in advance.

As described above, the reaction force characteristics for maintaining the sense of initiative has been described with the case of steering device ST as an example, and the same can be applied to the case of accelerator operation device and the brake operation device.

Figure 6A:
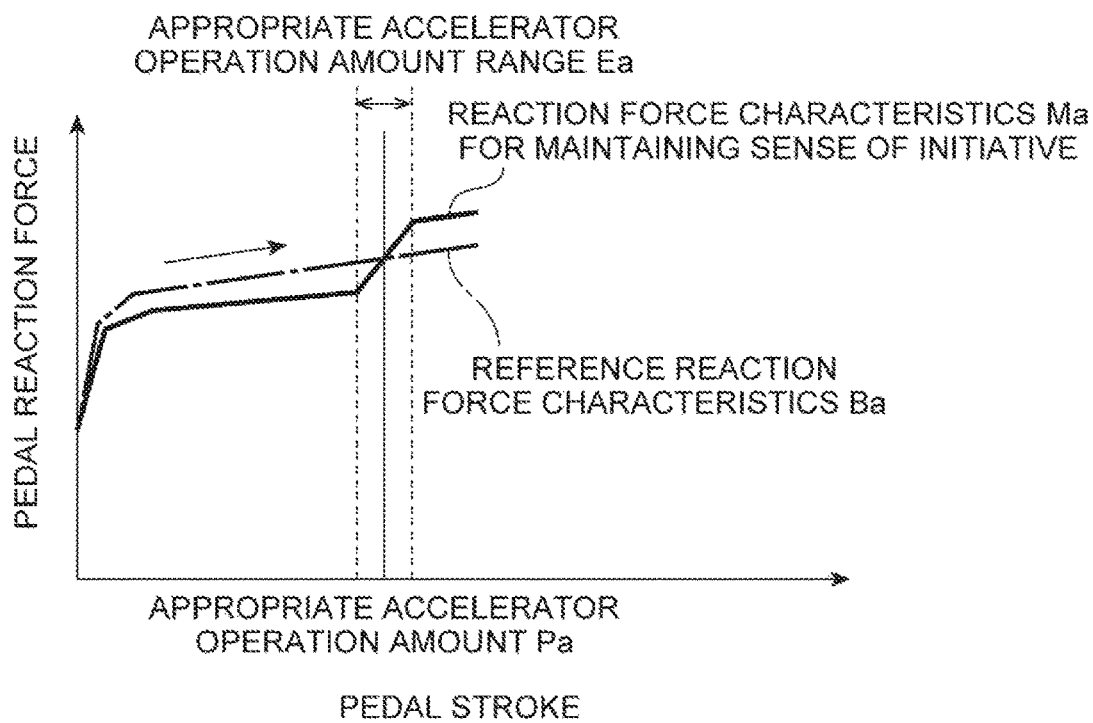
FIG. 6A is a graph illustrating reaction force characteristics when an accelerator pedal is pressed.

Here, FIG. 6A is a graph illustrating the reaction force characteristics when the accelerator pedal is pressed. The vertical axis in FIG. 6A represents the pedal reaction force, and the horizontal axis represents a pedal stroke (the amount of pressing of the pedal). The pedal reaction force of the accelerator pedal is the force that the accelerator pedal tries to return to the reference position (the initial position of the pedal). FIG. 6A illustrates an example of reaction force characteristics Ma for maintaining the sense of initiative and reference reaction force characteristics Ba in the accelerator pedal. In addition, FIG. 6A illustrates an appropriate accelerator operation amount Pa and an appropriate accelerator operation amount range Ea. In FIG. 6A, as a precondition, the current pedal stroke of the accelerator pedal is smaller than the appropriate accelerator operation amount Pa and is not included in the appropriate accelerator operation amount range Ea. The driver needs to press the accelerator pedal to make the operation amount reach the appropriate accelerator operation amount Pa.

In the situation illustrated in FIG. 6A, since it is determined by the determination unit 18 that the driver's pedal stroke corresponding to the appropriate accelerator operation amount Pa is not included in the appropriate accelerator operation amount range Ea, the reaction force characteristics change unit 19 changes the reaction force characteristics of the accelerator pedal from the reference reaction force characteristics Ba to the reaction force characteristics Ma for maintaining the sense of initiative.

The reaction force characteristics change unit 19 changes the reaction force characteristics to the reaction force characteristics Ma for maintaining the sense of initiative by performing the minute change such that the reaction force increase amount with respect to the increase of the pedal stroke of the accelerator pedal in the appropriate accelerator operation amount range Ea is large compared to that in the reference reaction force characteristics Ba. In the reaction force characteristics Ma for maintaining the sense of initiative, the reaction force increase amount with respect to the increase of the pedal stoke in the appropriate accelerator operation amount range Ea is large compared to the reaction force increase amount (the reaction force increase amount along the reference reaction force characteristics Ba) with respect to the increase of the pedal stoke from the accelerator operation amount at the time of determination that the pedal stroke of the accelerator pedal by the driver is not included in the appropriate accelerator operation amount range Ea to the time when the pedal stroke reaches the appropriate accelerator operation amount range Ea.

In the reaction force characteristics Ma for maintaining the sense of initiative, in order to increase the slope in the appropriate accelerator operation amount range Ea compared to that in the reference reaction force characteristics Ba, the slope becomes smaller in the range of the pedal stroke than the appropriate accelerator operation amount range Ea, but not becomes a negative slope. That is, in the reaction force characteristics Ma for maintaining the sense of initiative, the pedal reaction force does not decrease due to the increase of the pedal stroke.

Figure 6B:
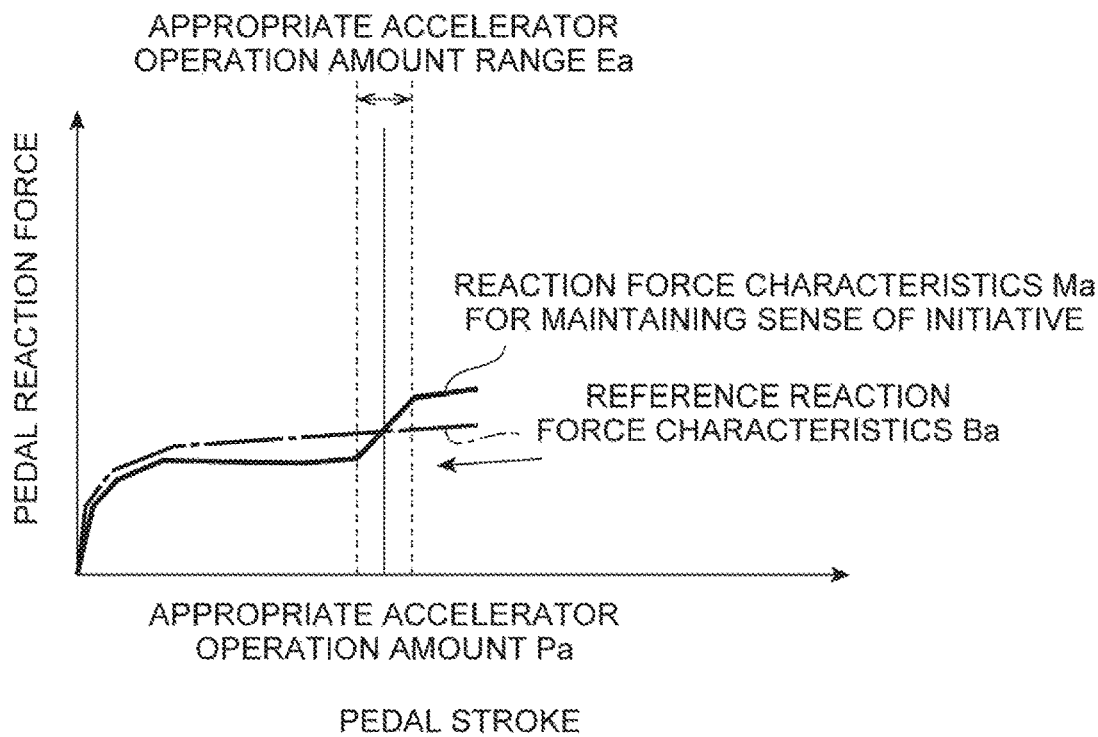
FIG. 6B is a graph illustrating reaction force characteristics when the accelerator pedal is released.

FIG. 6B is a graph illustrating the reaction force characteristics when the accelerator pedal is released. In FIG. 6B, as a precondition, the current pedal stroke of the accelerator pedal is equal to or larger than the appropriate accelerator operation amount Pa and exceeds the appropriate accelerator operation amount range Ea. The driver needs to release the accelerator pedal and return the accelerator pedal to reach the appropriate accelerator operation amount Pa by the reaction force.

In the situation illustrated in FIG. 6B also, since it is determined by the determination unit 18 that the driver's pedal stroke corresponding to the appropriate accelerator operation amount Pa is not included in the appropriate accelerator operation amount range Ea, the reaction force characteristics change unit 19 changes the reaction force characteristics of the accelerator pedal from the reference reaction force characteristics Ba to the reaction force characteristics Ma for maintaining the sense of initiative.

The reaction force characteristics change unit 19 changes the reaction force characteristics to the reaction force characteristics Ma for maintaining the sense of initiative by performing the minute change such that the reaction force decrease amount with respect to the decrease of the pedal stroke of the accelerator pedal in the appropriate accelerator operation amount range Ea is large compared to that in the reference reaction force characteristics Ba. In the reaction force characteristics Ma for maintaining the sense of initiative, the reaction force decrease amount with respect to the decrease of the pedal stoke in the appropriate accelerator operation amount range Ea is large compared to the reaction force decrease amount (the reaction force decrease amount along the reference reaction force characteristics Ba) with respect to the decrease of the pedal stoke from the accelerator operation amount at the time of determination to the appropriate accelerator operation amount range Ea. That is, when the pedal stroke enters the appropriate accelerator operation amount range Ea, the return of the accelerator pedal becomes slow.

The reaction force decrease amount with respect to the decrease of the pedal stroke corresponds to the slope of the reference reaction force characteristics Ba and the reaction force characteristics Ma for maintaining the sense of initiative in FIG. 6B. The reaction force characteristics change unit 19 performs the minute change on the reaction force characteristics of the accelerator pedal to be the reaction force characteristics Ma for maintaining the sense of initiative in which the slope in the appropriate accelerator operation amount range Ea becomes approximately three times or twice as large as the reference reaction force characteristics Ba. In the minute change, any magnification between 1.1 times to 5 times may be adopted. The reaction force characteristics Ma for maintaining the sense of initiative is the reaction force same as the reference reaction force characteristics Ba in the appropriate accelerator operation amount Pa.

Figure 7A:
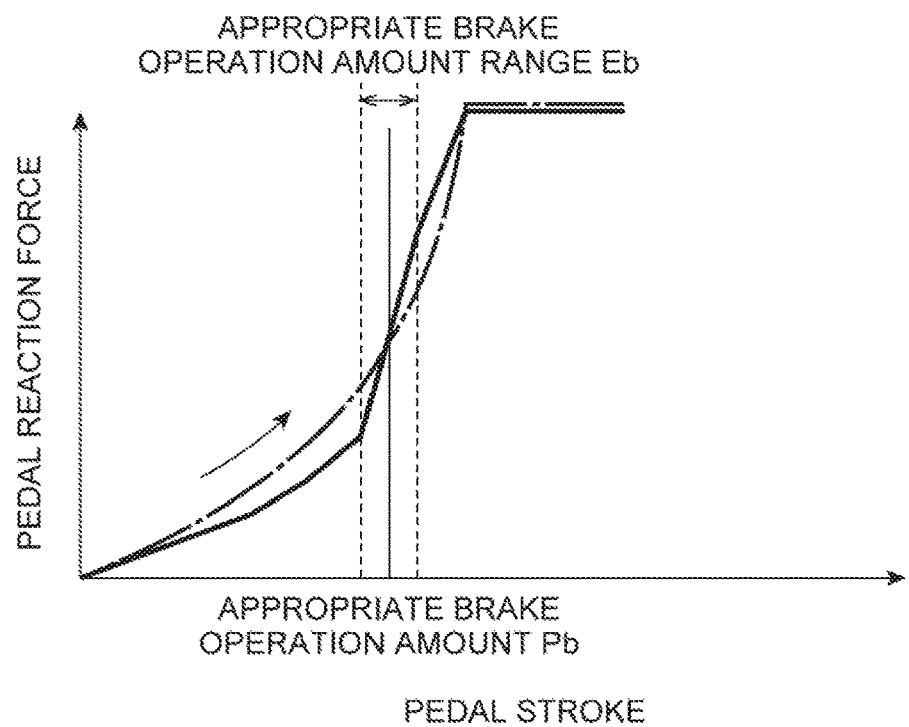
FIG. 7A is a graph illustrating reaction force characteristics when a brake pedal is pressed.

FIG. 7A is a graph illustrating the reaction force characteristics when the brake pedal is pressed. The vertical axis in FIG. 7A represents the pedal reaction force, and the horizontal axis represents a pedal stroke (the amount of pressing of the pedal). The pedal reaction force of the brake pedal is the force that the brake pedal tries to return to the reference position (the initial position of the pedal). FIG. 7A illustrates an example of reaction force characteristics Mb for maintaining the sense of initiative and reference reaction force characteristics Bb in the brake pedal. In addition, FIG. 7A illustrates an appropriate brake operation amount Pb and an appropriate brake operation amount range Eb. In FIG. 7A, as a precondition, the current pedal stroke of the brake pedal is smaller than the appropriate brake operation amount Pb and is not included in the appropriate brake operation amount range Eb. The driver needs to press the brake pedal to make the operation amount reach the appropriate brake operation amount Pb.

In the situation illustrated in FIG. 7A, since it is determined by the determination unit 18 that the driver's pedal stroke corresponding to the appropriate brake operation amount Pb is not included in the appropriate brake operation amount range Eb, the reaction force characteristics change unit 19 changes the reaction force characteristics of the brake pedal from the reference reaction force characteristics Bb to the reaction force characteristics Mb for maintaining the sense of initiative.

The reaction force characteristics change unit 19 changes the reaction force characteristics to the reaction force characteristics Mb for maintaining the sense of initiative by performing the minute change such that the reaction force increase amount with respect to the increase of the pedal stroke of the brake pedal in the appropriate brake operation amount range Eb is large compared to that in the reference reaction force characteristics Bb. In the reaction force characteristics Mb for maintaining the sense of initiative, the reaction force increase amount with respect to the increase of the pedal stoke in the appropriate brake operation amount range Eb is large compared to the reaction force increase amount (the reaction force increase amount along the reference reaction force characteristics Bb) with respect to the increase of the pedal stoke from the brake operation amount at the time of determination that the pedal stroke of the brake pedal by the driver is not included in the appropriate brake operation amount range Eb to the time when the pedal stroke reaches the appropriate brake operation amount range Eb.

In the reaction force characteristics Mb for maintaining the sense of initiative, in order to increase the slope in the appropriate brake operation amount range Eb compared to that in the reference reaction force characteristics Bb, the slope becomes smaller in the range of the pedal stroke than the appropriate brake operation amount range Eb, but not becomes a negative slope.

Figure 7B:
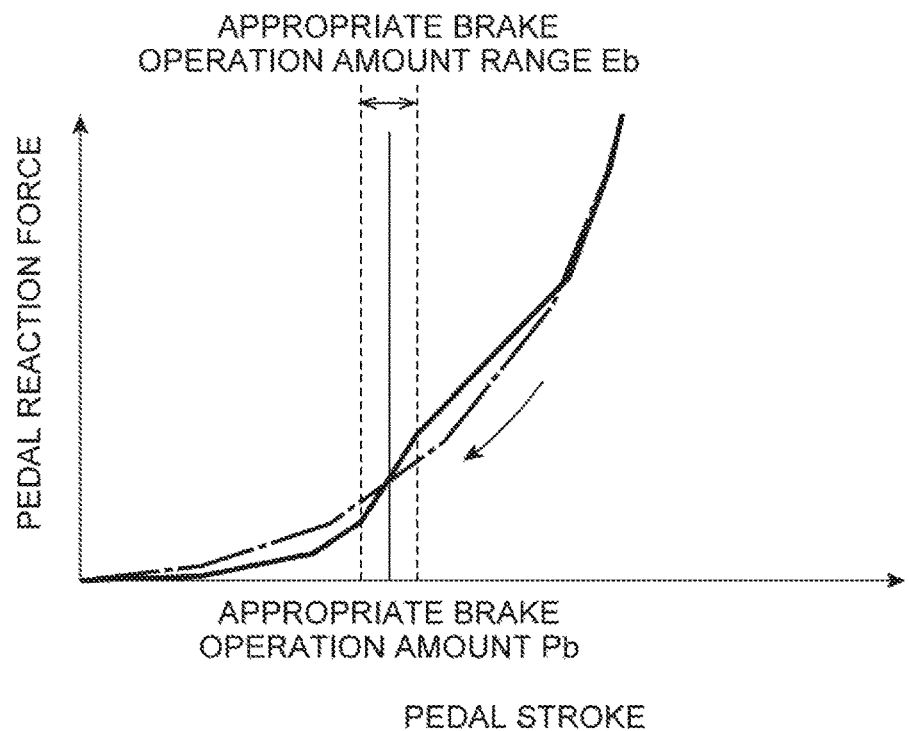
FIG. 7B is a graph illustrating reaction force characteristics when the brake pedal is released.

FIG. 7B is a graph illustrating the reaction force characteristics when the accelerator pedal is released. In FIG. 6B, as a precondition, the current pedal stroke of the brake pedal is equal to or larger than the appropriate brake operation amount Pb and exceeds the appropriate brake operation amount range Eb. The driver needs to release the brake pedal and return the brake pedal to reach the appropriate brake operation amount Pb by the reaction force.

In the situation illustrated in FIG. 7B also, since it is determined by the determination unit 18 that the driver's pedal stroke corresponding to the appropriate brake operation amount Pb is not included in the appropriate brake operation amount range Eb, the reaction force characteristics change unit 19 changes the reaction force characteristics of the brake pedal from the reference reaction force characteristics Bb to the reaction force characteristics Mb for maintaining the sense of initiative.

The reaction force characteristics change unit 19 changes the reaction force characteristics to the reaction force characteristics Mb for maintaining the sense of initiative by performing the minute change such that the reaction force decrease amount with respect to the decrease of the pedal stroke of the brake pedal in the appropriate brake operation amount range Eb is large compared to that in the reference reaction force characteristics Bb. In the reaction force characteristics Mb for maintaining the sense of initiative, the reaction force decrease amount with respect to the decrease of the pedal stoke in the appropriate brake operation amount range Eb is large compared to the reaction force decrease amount (the reaction force decrease amount along the reference reaction force characteristics Bb) with respect to the decrease of the pedal stoke from the brake operation amount at the time of determination to the appropriate brake operation amount range Eb. That is, when the pedal stroke enters the appropriate brake operation amount range Eb, the return of the accelerator pedal becomes slow.

The reaction force decrease amount with respect to the decrease of the pedal stroke corresponds to the slope of the reference reaction force characteristics Bb and the reaction force characteristics Mb for maintaining the sense of initiative in FIG. 7B. The reaction force characteristics change unit 19 performs the minute change on the reaction force characteristics of the brake pedal to be the reaction force characteristics Mb for maintaining the sense of initiative in which the slope in the appropriate brake operation amount range Eb becomes approximately three times or twice as large as the reference reaction force characteristics Bb. In the minute change, any magnification between 1.1 times to 5 times may be adopted. The reaction force characteristics Mb for maintaining the sense of initiative is the reaction force same as the reference reaction force characteristics Bb in the appropriate brake operation amount Pb.

The reaction force control unit 20 controls the reaction force of the operation device T based on the operation amount of the driver recognized by the operation amount recognition unit 15 and the reaction force characteristics of the operation device T. The reaction force control unit 20 transmits a reaction force command value that is from the operation amount of the driver and is according to the reaction force characteristics of the operation device T to the PID controller 7. The reaction force control unit 20 controls the reaction force of the operation device T by transmitting the command value corresponding to the PID control from the PID controller 7 to the reaction force actuator 8.

If the reference reaction force characteristics is set as the reaction force characteristics of the operation device T, the reaction force control unit 20 controls the reaction force of the operation device T by transmitting the reaction force command value that is from the operation amount of the driver and is corresponding to the reference reaction force characteristics to the PID controller 7. In addition, if the reaction force characteristics for maintaining the sense of initiative is set as the reaction force characteristics of the operation device T, the reaction force control unit 20 controls the reaction force of the operation device T by transmitting the reaction force command value that is from the operation amount of the driver and is according to the reaction force characteristics to the PID controller 7.

FIG. 8 is diagrams for explaining a functional outline of the driving assistance apparatus 100. In FIG. 8, a case of the steering device ST will be described as an example. (A) of FIG. 8 illustrates a prediction of the driver's appropriate steering amount. As illustrated in (A) of FIG. 8, the appropriate operation amount prediction unit 16 predicts the appropriate operation amount using the driving behavior model from the operation history of the driver, the external environment, the vehicle state, and the like. (B) of FIG. 8 is a diagram illustrating the driver's appropriate steering amount. As illustrated in (B) of FIG. 8, the appropriate steering amount (dashed line) at the prediction time point is predicted from the current steering amount of the driver (solid line).

(C) of FIG. 8 is a diagram illustrating the steering amount of the driver (input) at the prediction time point. The steering amount of the driver may be a steering angle or may be input as a steering torque. (D) of FIG. 8 is a diagram illustrating the reaction force characteristics for maintaining the sense of initiative set by the virtual model. Here, it is assumed that the reaction force characteristics of the steering device ST has already been changed to the reaction force characteristics for maintaining the sense of initiative. The reaction force control unit 20 transmits the reaction force command value that is from the operation amount of the driver illustrated in (C) of FIG. 8 and that is according to the reaction force characteristics for maintaining the sense of initiative illustrated in (D) of FIG. 8 to the PID controller 7. The PID controller 7 transmits a command value corresponding to the PID control to the reaction force actuator 8 (steering reaction force actuator).

(E) of FIG. 8 is a diagram illustrating a state in which the reaction force is given to the steering device ST and cooperates with the driver. As illustrated in (E) of FIG. 8, the reaction force control unit 20 controls the reaction force of the steering device ST by controlling the reaction force actuator 8 via the PID controller 7. The reaction force control unit 20 performs the reaction force control in cooperation with the driver by performing the control of the reaction force actuator 8 according to the reaction force characteristics for maintaining the sense of initiative in combination with the steering amount of the driver. The driver makes the steering amount easy to stay in the appropriate steering amount range Es by receiving the reaction force according to the reaction force characteristics for maintaining the sense of initiative. The driver can continuously maintain the sense of initiative for the driving operation almost without change in force sensing owing to the reaction force control by the driving assistance apparatus 100.

Processing by Driving Assistance Apparatus

Figure 9:
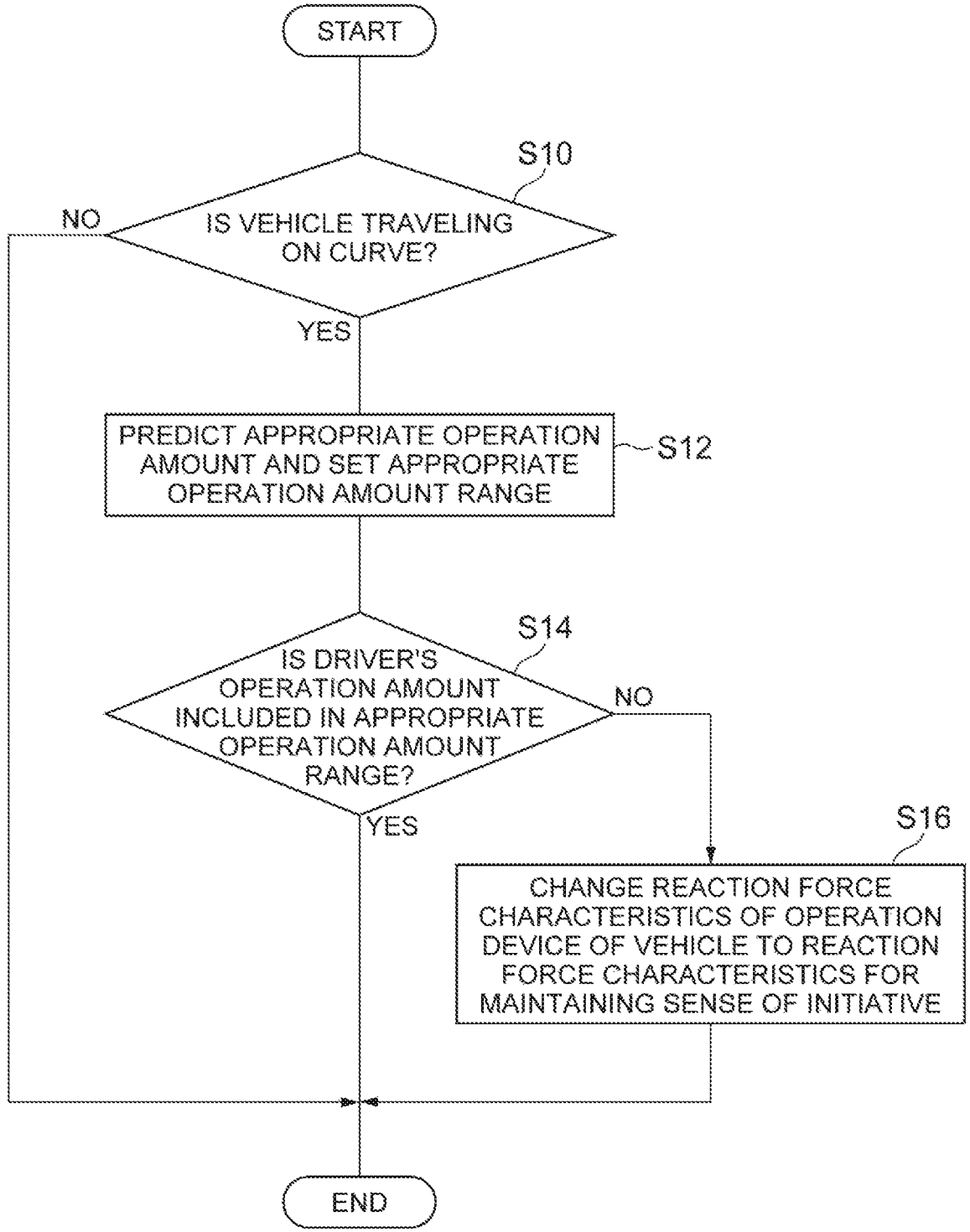
FIG. 9 is a flowchart illustrating an example of reaction force characteristics change processing.

Next, the processing by the driving assistance apparatus 100 in the present embodiment will be described with reference to the drawings. FIG. 9 is a flowchart illustrating an example of the reaction force characteristics change processing. The reaction force characteristics change processing illustrated in FIG. 9 is performed, for example, when the vehicle is traveling.

As illustrated in FIG. 9, as S10, the ECU 10 of the driving assistance apparatus 100 determines whether or not the vehicle is traveling on a curve using the curve traveling recognition unit 14. The curve traveling recognition unit 14 determines whether or not the vehicle is traveling on the curve based on the curvature of the traveling road recognized by the external environment recognition unit 12. If it is not determined that the vehicle is traveling on the curve (NO in S10), the ECU 10 ends the current processing. The ECU 10 repeats the processing from S10 again after a certain time has elapsed. If it is determined that the vehicle is traveling on the curve (YES in S10), the ECU 10 makes the process proceed to S12.

In S12, the ECU 10 performs the prediction of the appropriate operation amount using the appropriate operation amount prediction unit 16 and setting of the appropriate operation amount range using the appropriate operation amount range setting unit 17. The appropriate operation amount prediction unit 16 predicts the appropriate operation amount of the driver based on the operation history of the driver stored in the operation history storage unit 6, the external environment recognized by the external environment recognition unit 12, and the vehicle state recognized by the vehicle state recognition unit 13. The appropriate operation amount range setting unit 17 sets the appropriate operation amount range that is a range set in advance including the appropriate operation amount.

In S14, the ECU 10 determines whether or not the operation amount of the driver corresponding to the prediction time point for the appropriate operation amount is included in the appropriate operation amount range using the determination unit 18. The determination unit 18 performs the determination described above based on the operation amount of the driver recognized by the operation amount recognition unit 15 and the appropriate operation amount range set by the appropriate operation amount range setting unit 17. If it is determined that the operation amount of the driver corresponding to the prediction time point for the appropriate operation amount is included in the appropriate operation amount range (YES in S14), the ECU 10 ends the current processing. In this case, the reaction force characteristics of the operation device T remains the reference reaction force characteristics. The ECU 10 repeats the processing from S10 again after a certain time has elapsed. If it is determined that the operation amount of the driver corresponding to the prediction time point for the appropriate operation amount is not included in the appropriate operation amount range (NO in S14), the ECU 10 makes the process proceed to S16.

In S16, the ECU 10 changes the reaction force characteristics of the operation device T to the reaction force characteristics for maintaining the sense of initiative using the reaction force characteristics change unit 19. The reaction force characteristics change unit 19 can change the reaction force characteristics to the reaction force characteristics for maintaining the sense of initiative, for example, by a minute change from the reference reaction force characteristics. Thereafter, the ECU 10 ends the processing.

Figure 10:
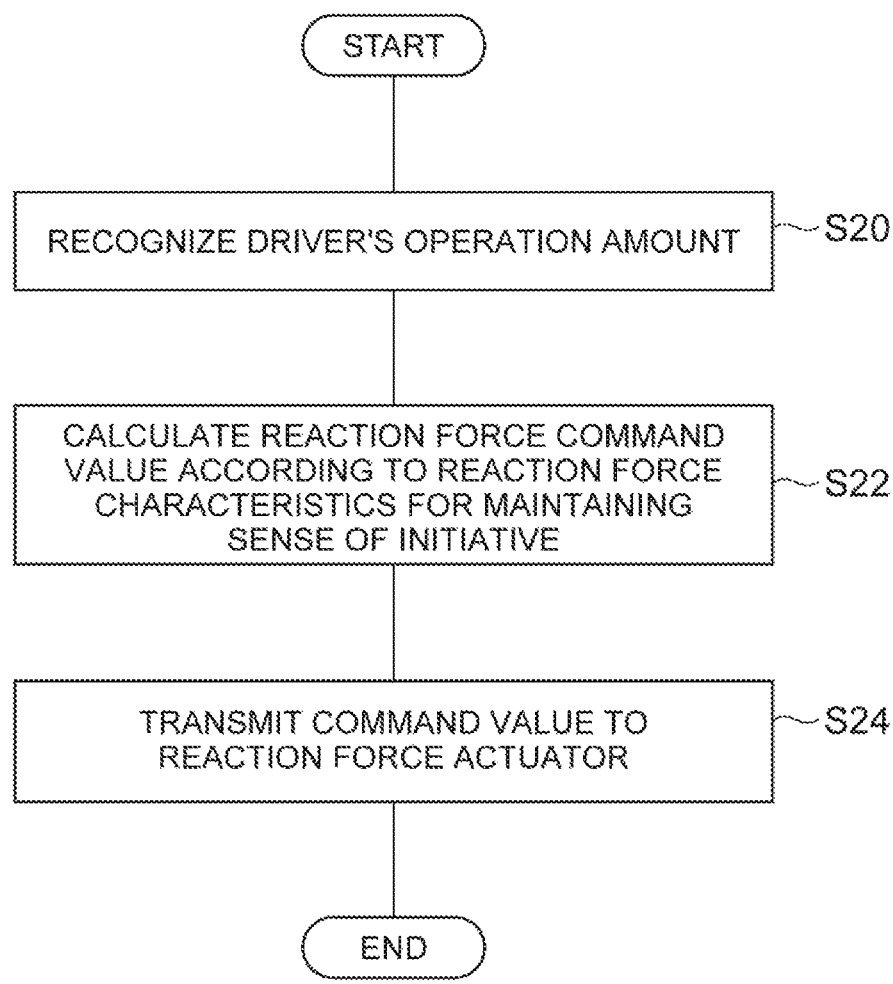
FIG. 10 is a flowchart illustrating an example of reaction force control processing.

Next, the reaction force control processing by the driving assistance apparatus 100 will be described. FIG. 10 is a flowchart illustrating an example of the reaction force control processing. The reaction force control processing is performed when the change to the reaction force characteristics for maintaining the sense of initiative is performed in in S16 in FIG. 9. The description for the case where the reaction force characteristics remain as the reference reaction force characteristics will be omitted.

As illustrated in FIG. 10, as S20, the ECU 10 recognizes the operation amount of the driver using the operation amount recognition unit 15. The operation amount recognition unit 15 recognizes the operation amount of the driver for the operation device T of the vehicle based on the operation amount information from the driving operation detection unit 4.

In S22, the ECU 10 calculates the reaction force command value according to the reaction force characteristics for maintaining the sense of initiative using the reaction force control unit 20. The reaction force control unit 20 calculates the reaction force command value based on the operation amount of the driver recognized by the operation amount recognition unit 15 and the reaction force characteristics.

In S24, the ECU 10 transmits the reaction force command value to the reaction force actuator 8 using the reaction force control unit 20. The reaction force control unit 20 controls the reaction force of the operation device T by transmitting the command value to the reaction force actuator 8 via the PID controller 7.

According to the driving assistance apparatus 100 in the present embodiment described above, when it is determined that the operation amount of the driver amount corresponding to the prediction time point for the appropriate operation amount is not included in the appropriate operation amount range, it is possible to make the operation amount of the driver stay in the appropriate operation amount range by changing the reaction force characteristics to the reaction force characteristics for maintaining the sense of initiative in which the operation amount of the driver is likely to remain in the appropriate operation amount range by performing the minute change on the reaction force characteristics of the operation device.

The driving assistance apparatus 100 changes the reaction force characteristics of the operation device to the reaction force characteristics for maintaining the sense of initiative such that the reaction force increase amount with respect to the increase of operation amount in the appropriate operation amount is large compared to the reaction force increase amount with respect to the increase of the operation amount from the operation amount at the time of determination to the appropriate operation amount range. In this case, since the reaction force increase amount with respect to the increase of the operation amount becomes large when the operation amount of the driver enters the appropriate operation amount range, it is possible to prevent the driver from increasing the force required for further operation and causing the operation amount of the driver to exceed the appropriate operation amount range, and thus, it is possible to make the operation amount of the driver easy to stay in the appropriate operation amount range.

In addition, in the driving assistance apparatus 100, when it is determined that the operation amount of the driver amount corresponding to the prediction time point for the appropriate operation amount is not included in the appropriate operation amount range, the driving assistance apparatus 100 changes the reaction force characteristics of the operation device to the reaction force characteristics for maintaining the sense of initiative such that the reaction force decrease amount with respect to the decrease of operation amount in the appropriate operation amount is large compared to the reaction force decrease amount with respect to the decrease of the operation amount from the operation amount at the time of determination to the appropriate operation amount range. In this case, since the reaction force decrease amount with respect to the decrease of the operation amount becomes large when the operation amount of the driver enters the appropriate operation amount range, and the reaction force that boosts the operation amount of the driver decreases, it is possible to prevent the operation amount of the driver from exceeding the appropriate operation amount range, and thus, it is possible to make the operation amount of the driver easy to stay in the appropriate operation amount range.

Furthermore, in the driving assistance apparatus 100, since it is easy for the operation amount of the driver to stay in the appropriate operation amount range by changing the reaction force characteristics of the operation device, it is possible to maintain the sense of initiative of the driver compared to the case where the operation amount of the driver is forcibly interfered so as to become the appropriate operation amount. Therefore, driving assistance apparatus 100, it is possible to perform the driving assistance such that the operation amount of the driver can be appropriate while maintaining the sense of initiative of the driver. As a result thereof, according to driving assistance apparatus 100, the driving assistance can be performed such that the operation amount of the driver becomes appropriate by the minute force sensing interaction which does not impair the sense of initiative of the driver, and thus, the driver has a feeling that his driving skill is improved, and it is possible to activate the driving behavior. In addition, it is possible to suppress the fluctuations in driver's operation when traveling the same lane in multiple times (large difference occurs in the operation amount for each traveling).

In addition, according to the driving assistance apparatus 100, when it is determined by the determination unit 18 that the steering amount of the driver corresponding to the prediction time point of the appropriate steering amount is not included in the appropriate steering amount range, and when it is determined by the curve traveling recognition unit 14 that the vehicle is traveling on the curve, since the reaction force characteristics of the steering device ST of the vehicle is changed to the reaction force characteristics for maintaining the sense of initiative, it is possible to make the steering amount of the driver easy to stay in the appropriate steering amount range when traveling on the curve where the appropriate steering by the driver is required. In addition, in the driving assistance apparatus 100, since it is easy for the steering amount of the driver to stay in the appropriate steering amount range by changing the reaction force characteristics of the steering device ST, it is possible to perform the driving assistance such that the steering amount of the driver becomes appropriate while maintaining the sense of initiative of the driver compared to the case where the steering amount of the driver is forcibly interfered so as to become the appropriate steering amount.

As described above, the preferred embodiment of the present disclosure has been described, however, the present disclosure is not limited to the embodiments described above. The present disclosure can be implemented in various forms including various modifications and improvements based on the knowledge of those skilled in the art, including the above-described embodiments.

The driving assistance apparatus 100 does not necessarily need to use the PID controller 7. The ECU 10 may be directly connected to the reaction force actuator 8. In this case, the ECU 10 may have a feedback function for suppressing the influence of disturbance instead of the PID controller 7.

The driving assistance apparatus 100 does not necessarily need to use the GPS receiver 1 and the map database 5. In this case, the ECU 10 does not need to include the vehicle position recognition unit 11. The external environment recognition unit 12 may recognize the external environment of the vehicle only from the result of detection performed by the external sensor 2.

The appropriate operation amount prediction unit 16 may predict the appropriate operation amount without using the vehicle state. In this case, the ECU 10 does not necessarily need to be connected to the internal sensor 3, and the ECU 10 does not need to include the vehicle state recognition unit 13. The appropriate operation amount may be any operation amount as long as the operation amount that is performed by the driver corresponding to the external environment along the operation history of the driver.

The appropriate operation amount prediction unit 16 may predict the appropriate operation amount using the driver's driving trend. The driver's driving trend can be obtained from the operation history of the driver using well-known evaluation technology.

The ECU 10 of the driving assistance apparatus 100 does not necessarily need to include the curve traveling recognition unit 14. If it is determined by the determination unit 18 that the operation amount of the driver corresponding to the prediction time point for the appropriate operation amount is included in the appropriate operation amount range regardless of whether the vehicle is traveling on the curve or not, the reaction force characteristics change unit 19 may change the reaction force characteristics of the operation device T to the reaction force characteristics for maintaining the sense of initiative.

The reaction force characteristics change unit 19 may change the reaction force characteristics for maintaining the sense of initiative according to the driver's driving trend and/or the driving skill. The driver's driving trend and the driving skill can be obtained from the operation history of the driver using well-known evaluation method. In the driver's skill, the characteristics (veteran characteristics, beginner characteristics, or the like) may be classified according to a result of comparison between the operation history of the driver and the reference model operation. When the driving skill of the driver is the veteran characteristics, the reaction force characteristics change unit 19 may decrease the slope in the appropriate steering amount range Es of the reaction force characteristics M for maintaining the sense of initiative in FIG. 3 and FIG. 4 compared to the case where the driver's driving skill is the beginner characteristics. For example, the slope may be set approximately 2 times the slope of the reference reaction force characteristics B when the driving skill of the driver is the veteran characteristics, and may be set to approximately three times the reference reaction force characteristics B when the driving skill of the driver is beginner characteristics.

The reaction force characteristics change unit 19 does not necessarily need to set the reaction force characteristics for maintaining the sense of initiative using the reference reaction force characteristics. The reaction force characteristics change unit 19 may set the reaction force characteristics for maintaining the sense of initiative regardless of the reference reaction force characteristics.

The driving assistance apparatus 100 performs the driving assistance such that the steering amount of the driver becomes appropriate while maintaining the sense of initiative of the driver, however, it does not exclude the forcible operation interference depending on the situation. In a situation where it is necessary to avoid contact between the vehicle and an object, the driving assistance apparatus 100 may perform the operation interference for forcibly changing the operation amount of the driver. The driving assistance apparatus 100 may determine whether there is a possibility of contact between the vehicle and the object, and may perform the change to the reaction force characteristics for maintaining the sense of initiative when it is determined that there is no possibility of contact.

What is claimed is:

1. A driving assistance apparatus that is configured to assist a driving operation of a vehicle by a driver, comprising:

a database that stores an operation history which is a history of an operation amount of the driver; and an electronic control unit (ECU) including a processor programmed to:

recognize the operation amount of the driver for an operation device of the vehicle;

recognize an external environment of the vehicle;

predict an appropriate operation amount which is the operation amount, at a prediction time point after a current time point, performed by the driver in correspondence with the external environment, based on the stored operation history of the driver and the external environment;

set an appropriate operation amount range including the appropriate operation amount when the appropriate operation amount is predicted;

determine whether or not the operation amount of the driver corresponding to the prediction time point of the appropriate operation amount is included in the appropriate operation amount range; and change reaction force characteristics of the operation device such that a reaction force increase amount with respect to the increase of the operation amount in the appropriate operation amount range is large compared to the reaction force increase amount with respect to the increase of the operation amount from the operation amount at the time of the determination to the appropriate operation amount range, or such that the reaction force decrease amount with respect to the decrease of the operation amount in the appropriate operation amount range is large compared to the reaction force decrease amount with respect to the decrease of the operation amount from the operation amount at the time of the determination to the appropriate operation amount range, when it is determined that the operation amount of the driver corresponding to the prediction time point of the appropriate operation amount is not included in the appropriate operation amount range.

2. The driving assistance apparatus according to claim 1, wherein the ECU is further programmed to;

recognize a steering amount of the driver for a steering device of the vehicle as the operation amount of the driver for the operation device, predict an appropriate steering amount as the appropriate operation amount, set an appropriate steering amount range as the appropriate operation amount range, determine whether or not the steering amount of the driver corresponding to the prediction time point of the appropriate steering amount is included in the appropriate steering amount range, and change the reaction force characteristics of the steering device, such that the reaction force increase amount with respect to the increase of the steering amount in the appropriate operation amount range is large compared to the reaction force increase amount with respect to the increase of the steering amount from the steering amount at the time of the determination which is the steering amount at the time of determination to the appropriate operation amount range, or such that the reaction force decrease amount with respect to the decrease of the steering amount in the appropriate steering amount range is large compared to the reaction force decrease amount with respect to the decrease of the steering amount from the steering amount at the time of the determination to the appropriate steering amount range, when it is determined that the steering amount of the driver corresponding to the prediction time point of the appropriate steering amount is not included in the appropriate steering amount range.

3. A driving assistance apparatus that is configured to assist a driving operation of a vehicle by a driver, comprising:

a database that stores an operation history which is a history of an operation amount of the driver; and an electronic control unit (ECU) including a processor programmed to:

recognize the operation amount of the driver for an operation device of the vehicle;

recognize an external environment of the vehicle;

predict an appropriate operation amount which is the operation amount, at a prediction time point after a current time point, performed by the driver in correspondence with the external environment, based on the stored operation history of the driver and the external environment;

set an appropriate operation amount range including the appropriate operation amount when the appropriate operation amount is predicted;

determine whether or not the operation amount of the driver corresponding to the prediction time point of the appropriate operation amount is included in the appropriate operation amount range; and change a reaction force characteristics of the operation device to a reaction force characteristics for maintaining the sense of initiative with which the operation amount of the driver amount can easily remain in the appropriate operation amount range by performing a minute change on the reaction force characteristics of the operation device when it is determined that the operation amount is included in the appropriate operation amount range, when it is determined that the operation amount of the driver corresponding to the prediction time point of the appropriate operation amount is not included in the appropriate operation amount range.

4. The driving assistance apparatus according to claim 3, wherein the ECU is further programmed to:

determine whether or not the vehicle is traveling on a curve, recognize a steering amount of the driver for the steering device of the vehicle as the operation amount of the driver for the operation device, predict an appropriate steering amount as the appropriate operation amount, set an appropriate steering amount range as the appropriate operation amount range, determine whether or not the steering amount of the driver corresponding to the prediction time point of the appropriate steering amount is included in the appropriate steering amount range, and when it is determined by the determination unit that the steering amount of the driver corresponding to the prediction time point of the appropriate steering amount is not included in the appropriate steering amount range and when it is determined that the vehicle is traveling on the curve, change the reaction force characteristics of the steering device to the reaction force characteristics for maintaining the sense of initiative.

* * * * *